US008688759B2

(12) United States Patent
Mody

(10) Patent No.: US 8,688,759 B2
(45) Date of Patent: Apr. 1, 2014

(54) EFFICIENT DETECTION ALGORITHM SYSTEM FOR A BROAD CLASS OF SIGNALS USING HIGHER-ORDER STATISTICS IN TIME AS WELL AS FREQUENCY DOMAINS

(75) Inventor: Apurva N. Mody, Lowell, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 1032 days.

(21) Appl. No.: 12/644,513

(22) Filed: Dec. 22, 2009

(65) Prior Publication Data
US 2011/0131260 A1 Jun. 2, 2011

Related U.S. Application Data

(63) Continuation-in-part of application No. 11/820,063, filed on Jun. 18, 2007, now Pat. No. 8,161,089.

(60) Provisional application No. 60/814,367, filed on Jun. 16, 2006.

(51) Int. Cl.
*G06F 17/14* (2006.01)

(52) U.S. Cl.
USPC .......................................................... 708/404

(58) Field of Classification Search
USPC .......................................................... 708/404
See application file for complete search history.

(56) References Cited

U.S. PATENT DOCUMENTS

| 5,231,403 | A | * | 7/1993 | Pierce | 342/192 |
| 5,337,053 | A | * | 8/1994 | Dwyer | 342/90 |
| 5,515,300 | A | | 5/1996 | Pierce | |
| 5,602,751 | A | * | 2/1997 | Edelblute | 702/77 |
| 6,294,956 | B1 | * | 9/2001 | Ghanadan et al. | 330/124 R |
| 6,697,633 | B1 | * | 2/2004 | Dogan et al. | 455/509 |
| 6,822,606 | B2 | * | 11/2004 | Ponsford et al. | 342/192 |
| 6,859,463 | B1 | | 2/2005 | Mayor et al. | |
| 6,944,434 | B2 | * | 9/2005 | Mattellini et al. | 455/296 |

(Continued)

FOREIGN PATENT DOCUMENTS

| WO | 2007/056081 A1 | 5/2007 |
| WO | 2009/009777 A1 | 1/2009 |

OTHER PUBLICATIONS

PCT Search Report dated Oct. 8, 2008 of Patent Application No. PCT/US2008/069893 filed Jul. 7, 2008.

(Continued)

*Primary Examiner* — Chuong D Ngo
*Assistant Examiner* — Kevin G Hughes
(74) *Attorney, Agent, or Firm* — Maine Cernota & Rardin; David A. Rardin

(57) ABSTRACT

An algorithm system to detect a broad class of signals in Gaussian noise using higher-order statistics. The algorithm system detects a number of different signal types. The signals may be in the base-band or the pass-band, single-carrier or multi-carrier, frequency hopping or non-hopping, broad-pulse or narrow-pulse etc. In a typical setting this algorithm system provides an error rate of 3/100 at a signal to noise ratio of 0 dB. This algorithm system gives the time frequency detection ratio that may be used to determine if the detected signal falls in Class Single-Carrier of Class Multi-Carrier. Additionally this algorithm system may be used for a number of different applications such as multiple signal identification, finding the basis functions of the received signal and the like.

36 Claims, 11 Drawing Sheets

(56) References Cited

U.S. PATENT DOCUMENTS

| | | | |
|---|---|---|---|
| 7,567,635 B2* | 7/2009 | Scheim et al. | 375/341 |
| 2003/0081804 A1* | 5/2003 | Kates | 381/316 |
| 2006/0097730 A1* | 5/2006 | Park et al. | 324/534 |
| 2006/0153283 A1* | 7/2006 | Scharf et al. | 375/148 |
| 2007/0100922 A1 | 5/2007 | Ashish | |
| 2010/0002816 A1* | 1/2010 | Mody et al. | 375/350 |

OTHER PUBLICATIONS

Sadler, B.M. et al., "Estimation and Detection in NonGaussian Noise Using Higher Order Statistics", IEEE Trans. Signal Processing, Oct. 1994, pp. 2729-2741, vol. 42, No. 10.

Giannakis, G.B. et al., "A Unifying Maximum-Likelihood View of Cumulant and Polyspectral Measures for Non-Gaussian Signal Classification and Estimation", IEEE Trans. Inform. Theory, Mar. 1992, pp. 386-406, vol. 38, No. 2.

Shanmugan, K.S. et al., "Random Signals: Detection, Estimation and Data Analysis", John Wiley & Sons, New York, 1988.

Mendel, J.M., Tutorial on Higher-Order Statistics (Spectra) in Signal Processing and Systems Theory: Theoretical Results and Some Applications, IEEE Trans. Signal Processing, Mar. 1991, pp. 278-305, vol. 79, No. 3.

Nikias, C.L. et al,, "Signal Processing with Higher-Order Spectra", IEEE J. Select. Areas Commun., Jul. 1993, pp. 10-37.

Pagnan, S. et al., "Experimental Evaluation of Cumulant-Based Classifiers on Noisy Images", IEEE, 1995, pp. 2419-2422.

Mitola, J., "Cognitive Radio: An Integrated Agent Architecture for Software Defined Radio", Ph.D. Thesis, Royal Institute of Technology, Sweden, Spring 2000.

Haykin, Simon, "Coginitive Radio: Brain-Empowered Wireless Communications", IEEE; Feb. 2005, 9 pgs., vol. 23, No. 2.

* cited by examiner

EFFICIENT DETECTION ALGORITHM SYSTEM FOR A BROAD CLASS OF SIGNALS USING HIGHER-ORDER STATISTICS IN TIME AS WELL AS FREQUENCY DOMAINS

RELATED APPLICATIONS

This application is a continuation in part of U.S. application Ser. No. 11/820,063 filed Jun. 18, 2007 now U.S. Pat. No. 8,161,089 which claims benefit of U.S. Provisional Application Ser. No. 60/814,367 filed Jun. 16, 2006. In addition, U.S. application Ser. No. 12/342,485 filed Dec. 23, 2008 which is a continuation of PCT International Application Serial No. PCT/US08/69893 filed Jul. 11, 2008 which claims benefit of U.S. Provisional Application Ser. No. 60/959,254 filed Jul. 12, 2007 are herein incorporated in their entirety by reference.

STATEMENT OF GOVERNMENT INTEREST

The present invention was made under Contract No. W15P7T-05-C-P033 awarded by the Defense Advanced Research Projects Agency (DARPA), and the United States Government has certain rights in this invention.

FIELD OF THE INVENTION

This invention relates to signal processing and more particularly to algorithm systems for use in detecting a broad class of signals in Gaussian noise using higher-order statistics.

BACKGROUND OF THE INVENTION

As telecommunications equipment evolves in capability and complexity, and multiple-input and multiple-output (MIMO) systems push the system throughput, it is not going to be too long before we start seeing cognitive radios in the marketplace, as is disclosed in J. Mitola, "Cognitive Radio: An Integrated Agent Architecture for Software Defined Radio," Ph. D. Thesis, Royal Institute of Technology, Sweden, Spring 2000; and S. Haykin, "Cognitive Radio: Brain-Empowered Wireless Communications," IEEE J. Select. Areas Commun., vol. 23, no. 2, pp. 201-220, February 2005, the contents all of which are incorporated herein by reference. Cognitive radios will help not just the commercial systems but the military communication systems as well, by doing away with the need for comprehensive frequency planning. In fact, a cognitive radio would be capable of sensing its environment, making decisions on the types of signals present, learning the patterns and choosing the best possible method of transmitting the information. They would be situation aware, and capable of making decisions to ensure error-free and smooth transfer of bits between the users. Cognitive radios will be based on software defined radio (SDR) platforms and will try to understand not only what the users want but also what the surrounding environment can provide. The first step for any cognitive radio will be to understand the surrounding environment and to detect the ambient signals that are present.

The prior art discusses work on signal detection in AWGN using HOS as qualifiers, as is disclosed in B. M. Sadler, G. B. Giannakis, and K. S. Lii, "Estimation and Detection in Non-Gaussian Noise Using Higher Order Statistics," IEEE Trans. Signal Processing, vol. 42, no. 10, pp. 2729{2741, October 1994; and G. B. Giannakis and M. Tsatsanis, "A Unifying Maximum-Likelihood View of Cumulant and Polyspectral Measures for Non-Gaussian Signal Classification and Estimation," IEEE Trans. Inform. Theory, vol. 38, no. 2, pp. 386-406, March 1992, the contents all of which are incorporated herein by reference.

A typical procedure is to collect the signal from the surrounding environment and to identify whether it represents some meaningful information or it is just noise.

A need therefore exists for an improved algorithm system for use in detecting a broad class of signals in Gaussian noise using higher-order statistics for applications such as cognitive radios.

BRIEF SUMMARY OF THE INVENTION

Aspects of the invention address the above needs and provide at least the advantages below.

The present invention addresses this first step of signal detection in presence of additive white Gaussian noise (AWGN) using higher-order statistics (HOS). Next provided are several different applications where our algorithm system may be used along with the results on real-time over the air collected test waveforms.

The algorithm system is extremely efficient and simple to implement and it may be used to detect a broad class of signal types such as base-band, pass-band, single-carrier, multi-carrier, frequency-hopping, non-frequency-hopping, broad-band, narrow-band, broad-pulse, narrow-pulse etc. The signal detection algorithm system performs well at low signal to noise ratio (SNR), and based on system requirements for tolerable probability of detection (PD) and probability of false alarms (PFA) it is possible to tailor the algorithm system performance by altering a few parameters. Additionally, this algorithm system gives the time frequency detection ratio (TFDR) which may be used to determine if the detected signal falls in Class Single-Carrier of Class Multi-Carrier. Finally described are applications such as multiple signal identification and finding the basis functions for the received signal where this algorithm system may be used effectively.

Embodiments provide a method for implementation of a Spectrum Sensing Function (SSF) for detecting signals in Gaussian noise, wherein Higher Order Statistics (HOS) are applied to segments of received signals in at least one of time and frequency domains comprising the steps of moving to a particular portion of a frequency spectrum; applying a band pass filter; applying a low noise amplifier to output of the band pass filter; adjusting gain of the amplified output of the band pass filter; collecting waveforms in the portion of a frequency spectrum; downconverting the collected waveforms; applying an analog to digital conversion; applying a low pass filter; converting to focus on a spectrum of interest; sampling to adjust a sampling rate; applying serial to parallel conversion to convert a stream of samples; applying a Fast Fourier Transform (FFT); detecting at least one signal using the Higher Order Statistics; classifying a segment as belonging to Class Signal or Class Noise; and identifying the at least one signal. Another embodiment comprises the step of processing the at least one signal in the time domain to detect at least one signal. Another embodiment comprises the step of processing the at least one signal in the frequency domain to detect at least one signal. Another embodiment comprises the step of processing the at least one signal in the time as well as the frequency domains and combining results to detect at least one signal. Another embodiment comprises the step of dividing received data sample stream into smaller segments, whereby the Higher Order Statistics (HOS) signal detection is carried out for each of the segments. Another embodiment comprises dividing the data segments into real and imaginary parts, wherein R is the number of moments ($m_{r\_real}$, $m_{r\_imaginary}$) and cumulants ($c_{r\_real}$, $c_{r\_imaginary}$) of order greater than two available for computation for the real and the imaginary parts of each of the data segments respectively; choosing a value for probability step parameter ($\delta$) between zero and one; setting Psignal_real and Psignal_imaginary to 0.5; choosing a value for fine threshold parameter ($\gamma$) greater than zero, wherein the fine threshold parameter $\gamma$ is used to control probability of false alarm PFA and probability of detection PD; computing all R+2 moments and cumulants, wherein for r=3 to (R+2), if $|cr\_real|$ is less than $\gamma|m_{2\_real}|r/2$, then $P_{Signal\_real}$ equals $P_{Signal\_real}+\delta$, if $|c_{r\_real}|$ is greater than or equal to $\gamma|m_{2\_real}|r/2$, then $P_{Signal\_real}$ equals $P_{Signal\_real}, +\delta$, and wherein if $|cr\_imaginary|$ is less than $\gamma|m_{2\_imaginary}|r/2$, then $P_{Signal\_imaginary}$ equals $P_{Signal\_imaginary}-\delta$, if $|c_{r\_imaginary}|$ is greater than or equal to $\gamma|m_{2\_imaginary}|r/2$, then $P_{Signal\_imaginary}$ equals $P_{Signal\_imaginary}+\delta$, and wherein PSignal equals $aP_{Signal\_real}$ plus $bP_{Signal\_imaginary}$, wherein a and b are weight parameter coefficients; assigning the data sample segment to Class Signal if PSignal is greater than or equal to 0.5; and assigning the data sample segment to Class Noise if PSignal is less than 0.5 and no signal is detected. In another embodiment, a Fourier Transform is applied to the data segments to convert the data segments into the frequency domain. In another embodiment, the Fourier Transform is a Fast Fourier Transform (FFT). In another embodiment, results of signal detection in the time and the frequency domains are combined to determine if the data segment belongs to Class Signal or Class Noise; and wherein combining is defined by Psignal=c Psignal_time d Psignal_frequency, where c and d are coefficients such that c+d=1. Another embodiment further comprises pre-processing, the preprocessing comprising at least one of filtering, noise whitening, down-conversion, up-conversion, frequency shift, frequency translation, re-sampling, down-sampling, up-sampling, signal conditioning, wherein the preprocessing is applied to the data segments before computing the HOS of the data segments in at least one of the time and the frequency domains, and wherein sequence of the preprocessing is alterable. In another embodiment the received signals are in baseband. In another embodiment, the received signals are in pass-band. In another embodiment, the received signals are single-carrier. In another embodiment, the received signals are multi-carrier. In another embodiment, the received signals are frequency hopping. In another embodiment, the received signals are non-frequency hopping. In another embodiment, the received signals are at least one of Direct Sequence Spread Spectrum and Multi-Carrier Spread Spectrum. In another embodiment, the received signals are non-Gaussian in the time domain. In another embodiment, the received signals are non-Gaussian in the frequency domain. In another embodiment, detecting the at least one signal using the higher order statistics further comprises adjusting a fine threshold parameter ($\gamma$); and reclassifying the at least one signal. Another embodiment comprises choosing all cumulants greater than two for computation of signal detection probabilities. In another embodiment, one SSF interfaces with at least one of a Spectrum Manager or a Cognitive Engine. In another embodiment, a plurality of SSFs interface with at least one of a Spectrum Manager or a Cognitive Engine. In another embodiment, a plurality of SSFs interface with a plurality of Spectrum Managers or Cognitive Engines. In another embodiment, the decision on whether a signal is detected in the channel or sub-band is used by a Cognitive Engine or a Spectrum Manager to further arrive at a decision on whether the channel or sub-band may be used for communications. In another embodiment, the SSF reports total signal energy in every channel at least one of a sub-band, a Power Spectral Density (PSD), an Average Channel Power (ACP), a Received Signal Strength Indicator (RSSI), a Carrier to Interference plus Noise Ratio (CINR), or a Field Strength (in dB microVolts/m) so that at least one of a Spectrum Manager or a Cognitive Engine can make a better decision on prioritizing the use of the channel or sub-band. Another embodiment comprises choosing a probability step parameter ($\delta$) equal to one-half the inverse of a number of moments and cumulants of order greater than two available for computation of real and imaginary parts of each segment of the received signal. Another embodiment comprises choosing a subset of the cumulants for computation of signal detection probabilities.

Other embodiments provide a method for implementation of a spectrum sensing function for detecting signals in Gaussian noise, wherein Higher Order Statistics (HOS) are applied to segments of received signals in at least one of time and frequency domains comprising the steps of moving to a particular portion of a frequency spectrum; dividing received data sample stream into smaller segments, whereby the HOS signal detection is carried out for each of the segments; preprocessing, the preprocessing comprising at least one of filtering, noise whitening, down-conversion, up-conversion, frequency shift, frequency translation, re-sampling, down-sampling, up-sampling, signal conditioning, wherein the preprocessing is applied to the data segments before computing the HOS of the data segments in at least one of the time and the frequency domains, and wherein sequence of the preprocessing is alterable; applying a band pass filter; applying a low noise amplifier to output of the band pass filter; adjusting gain of the amplified output of the band pass filter; collecting waveforms in the portion of a frequency spectrum; downconverting the collected waveforms; applying an analog to digital conversion; applying a low pass filter; converting to focus on a spectrum of interest; sampling to adjust a sampling rate; applying serial to parallel conversion to convert a stream of samples; applying a Fast Fourier Transform (FFT), wherein the FFT is applied to the data segments to convert the data segments into the frequency domain; detecting at least one signal using the Higher Order Statistics, wherein the HOS signal detection is in the time and the frequency domains; dividing the data segments into real and imaginary parts, wherein R is the number of moments ($m_{r\_real}$, $m_{r\_imaginary}$) and cumulants ($c_{r\_real}$, $c_{r\_imaginary}$) of order greater than two available for computation for the real and the imaginary parts of each of the data segments respectively; choosing a value for probability step parameter ($\delta$) equal to one-half the inverse of a number of moments and cumulants of order greater than two available for computation of real and imaginary parts of each segment of the received signal; choosing a value for fine threshold parameter ($\gamma$) greater than zero, wherein the fine threshold parameter $\gamma$ is used to control probability of false alarm $P_{FA}$ and probability of detection $P_D$; setting $P_{signal\_real}$ and $P_{signal\_imaginary}$ to 0.5; computing all R+2 moments and cumulants, wherein for R=3 to (R+2), if $|c_{r\_real}|$ is less than $\gamma|m_{2\_real}|r/2$, then $P_{Signal\_real}$ equals $P_{Signal\_real}-\delta$, if $|c_{r\_real}|$ is greater than or equal to $\gamma|m_{2\_real}|r/2$, then $P_{Signal\_real}$ equals $P_{Signal\_real}+\delta$, and wherein if $|c_{r\_imaginary}|$ is less than $\gamma|m_{2\_imaginary}|r/2$, then $P_{Signal\_imaginary}$ equals $P_{Signal\_imaginary}-\delta$, if $|c_{r\_imaginary}|$ is greater than or equal to $\gamma|m_{2\_imaginary}|r/2$, then $P_{Signal\_imaginary}$ equals $P_{Signal\_imaginary}+\delta$, and wherein $P_{Signal}$ equals $aP_{Signal\_real}$ plus $bP_{Signal\_imaginary}$, wherein a and b are weight parameter coefficients; assigning the data sample segment to Class Signal if $P_{Signal}$ is greater than or equal to 0.5; assigning the data sample segment to Class Noise if $P_{Signal}$ is less than 0.5 and no signal is detected; adjusting a fine threshold parameter ($\gamma$);

reclassifying the at least one signal; classifying a segment as belonging to Class Signal or Class Noise, wherein results of the HOS signal detection in the time and the frequency domains are combined to determine if the data segment belongs to Class Signal or Class Noise; and identifying the at least one signal.

Yet Other embodiments provide a system for Spectrum Sensing and signal identification wherein Higher Order Statistics (HOS) are applied to segments of received signals in time and frequency domains comprising signal detection and identification classification modules configured to perform the steps of moving to a particular portion of a frequency spectrum; applying a band pass filter; applying a low noise amplifier to output of the band pass filter; adjusting gain of the amplified output of the band pass filter; collecting waveforms present in the spectrum; downconverting the collected waveforms; applying an analog to digital conversion in an analog to digital converter; first filtering down-converted signal through an image rejection first Low Pass (LP) filter, wherein an image of the downconverted signal is suppressed; upconverting the first filtered signal, wherein a video carrier would be shifted closer to 0 Hertz frequency; second filtering the upconverted signal; downsampling the second filtered signal; converting samples of the downsampled signal from serial to parallel in a serial to parallel converter; collecting the samples; storing the samples in a buffer; applying a Fast Fourier Transform (FFT); determining higher order moments and cumulants of real and imaginary portions of the stored samples; calculating signal probability; and classifying the received signal.

Yet further embodiments provide a method for classifying a Denial of Service (DoS) signal comprising the steps of determining bit error rate degradation of a received signal; determining the Carrier to Interference plus Noise Ratio (CINR); determining the Received Signal Strength Indication (RSSI); performing signal or noise detection on the received signal using higher order statistics (HOS); detecting time and frequency domain components of the received signal; and identifying Gaussianity whereby the DoS signal is classified from results of the detecting step.

Still further embodiments provide a method for signal identification comprising the steps of moving to a particular portion of a frequency spectrum; applying a band pass filter; collecting waveforms present in the spectrum; downconverting the collected waveforms; applying an analog to digital conversion; first filtering down-converted signal through an image rejection first Low Pass (LP) filter, wherein an image of the downconverted signal is suppressed; upconverting the first filtered signal, wherein a characteristic frequency component of the signal would be shifted closer to 0 Hertz frequency; second filtering the upconverted signal; downsampling the second filtered signal; converting samples of the downsampled signal from serial to parallel; collecting the samples; storing the samples in a buffer; applying a Fast Fourier Transform (FFT); determining higher order moments and cumulants of real and imaginary portions of the stored samples; calculating signal probability; classifying received signal; and choosing a probability step parameter ($\delta$) equal to one-half the inverse of a number of moments and cumulants of order greater than two available for computation of real and imaginary parts of each segment of the received signal. Another embodiment comprises choosing all cumulants greater than two for computation of signal detection probabilities. Another embodiment comprises choosing a subset of cumulants for computation of signal detection probabilities. In another embodiment, Class Signal or Class Noise determination is performed in the frequency domain by computing Psignal_frequency, where Psignal_frequency=Psignal computed in the frequency domain. Another embodiment comprises choosing some of the cumulants greater than two for computation of signal detection probabilities. Another embodiment comprises choosing only even ordered cumulants (e.g. 4, 6, 8 etc.) for computation of the signal detection probabilities. Another embodiment comprises choosing only some of the even ordered cumulants for computation of the signal detection probabilities. In an embodiment, the channel or the sub-band with the lowest PSD, RSSI, or Field Strength is selected for communications. In another embodiment, classifying the detected signal into Class Single Carrier or Class Multi Carrier is based on the Time Frequency Detection Ratio.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is further described with reference to the accompanying drawings wherein.

DETAILED DESCRIPTION OF THE INVENTION

I. Higher-Order Statistics as Non-Gaussian Qualifiers

Figure 1:
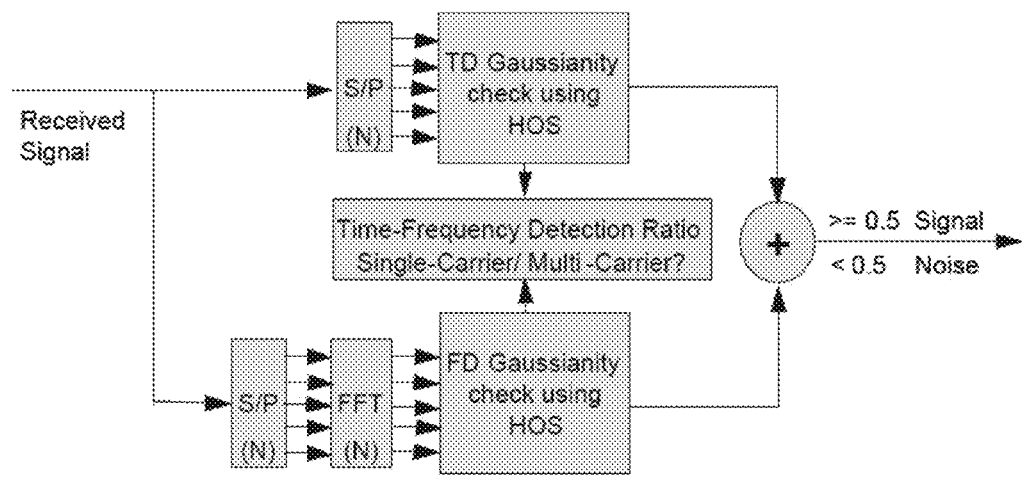
FIG. 1 is a block diagram for the signal or noise identification algorithm system of the present invention.
Figure 2:
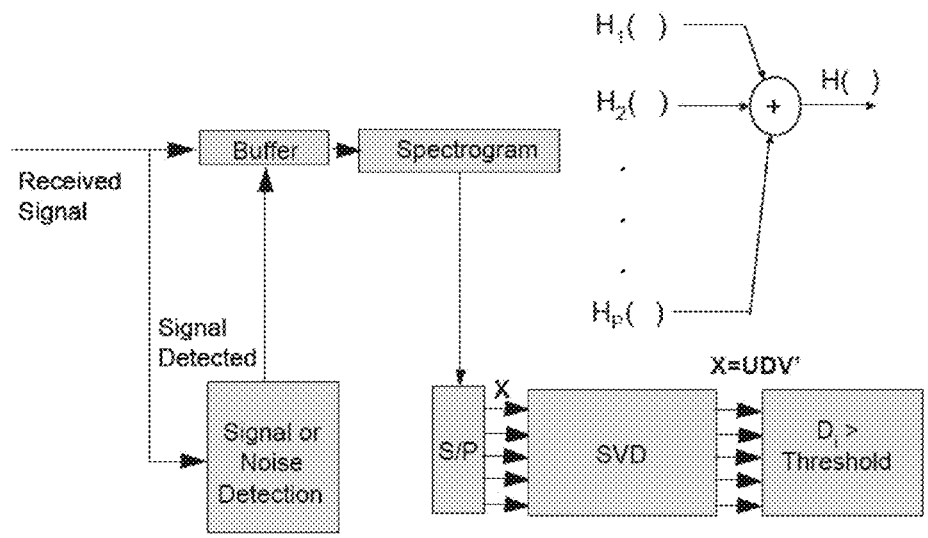
FIG. 2 is a block diagram for identifying the number of signal types in the received signal in an embodiment of the present invention.
Figure 3:
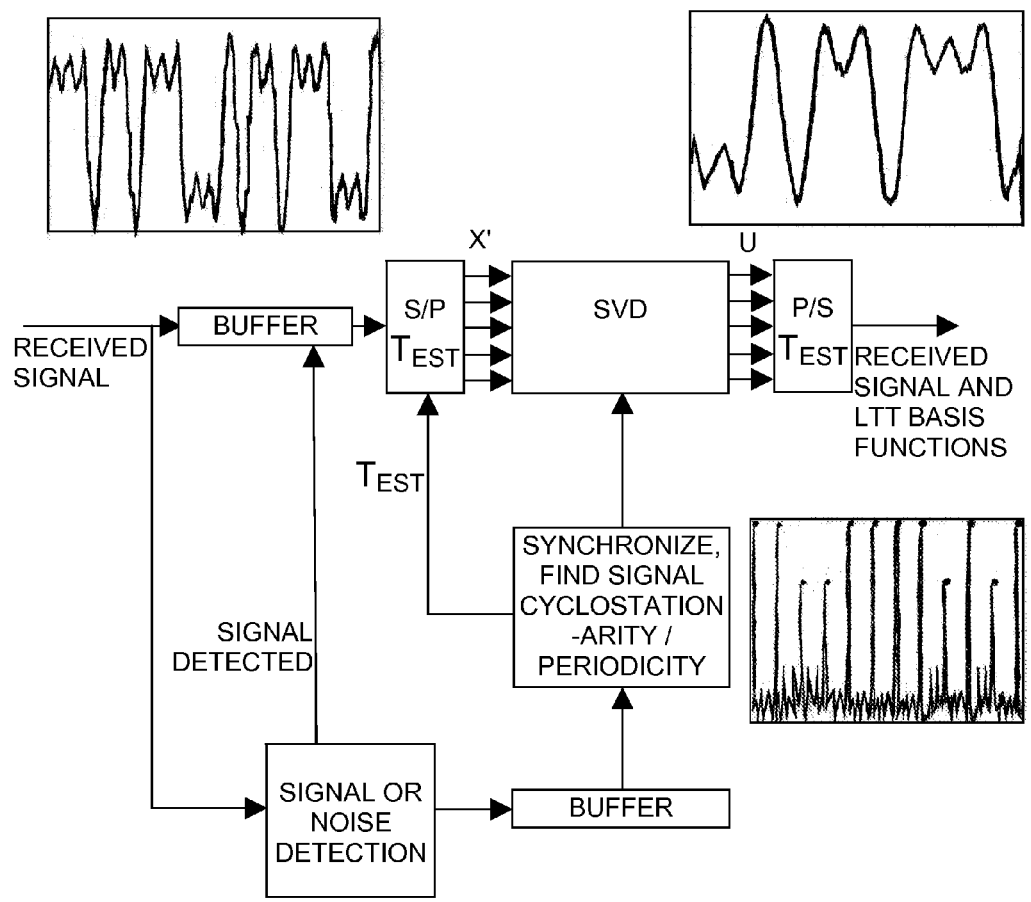
FIG. 3 is a block diagram for finding the basic functions of the received signal in an embodiment of the present invention.

It is known that the higher-order cumulants for a Gaussian process are zero, as is disclosed in K. S. Shanmugan and A. M. Breipohl, "Random Signals: Detection, Estimation and Data Analysis," John Wiley & Sons, New York, 1988; J. M. Mendel, "Tutorial on Higher-Order Statistics (Spectra) in Signal Processing and Systems Theory: Theoretical Results and Some Applications," IEEE Trans. Signal Processing, vol. 79, no. 3, pp. 278{305, March 1991; and C. L. Nikias and J. M. Mendel, "Signal Processing with Higher-Order Spectra," IEEE J. Select. Areas Commun., pp. 10-37, July 1993, the contents all of which are incorporated herein by reference. Cumulants are defined as the multiplicative coefficients for each term of the Taylor series expansion of the logarithm of the characteristic function. The characteristic function of $\psi_X(\omega)$ of a random variable X is defined as $$\psi_X(\omega) = E\{\exp(j\omega X)\}, \quad (1)$$

where $j=\sqrt{-1}$. The natural logarithm of the characteristic function is defined as the cumulant generating function $$c_X(\omega) = \log\{\psi_X(\omega)\}, \quad (2)$$

or in other words, $$\exp\{c_X(\omega)\} = \psi_X(\omega). \quad (3)$$

Expanding both sides of the equation in a series form results in the following equality.

$$\exp\left\{c_1(j\omega) + c_2\frac{(j\omega)^2}{2!} + \ldots + c_n\frac{(j\omega)^n}{n!}\right\} = \quad (4)$$

$$1 + j\omega E[X] + \frac{(j\omega)^2}{2!}E[X^2] + \ldots + \frac{(j\omega)^n}{n!}E[X^n],$$

where $c_1, c_2 \ldots c_n$ are the cumulants of the random process and $E[X]=m_1, E[X^2]=m_2, \ldots E[X^n]=m_n$ are the moments of the random process. When both the sides of the equations are expanded and the powers compared, we can obtain the relationship between the moments and the cumulants of the random process as $$c_1 = m_1 \quad (5)$$
$$c_2 = m_2 - m_1^2$$
$$c_3 = m_3 - 3m_1 m_2 + 2m_1^3$$
$$c_4 = m_4 - 4m_1 m_3 - 3m_2^2 + 12m_1^2 m_2 - 6m_1^4.$$
$$\vdots$$

Since we need to extract these statistics of the random process from the collected waveforms, after sampling the waveforms, we divide them into segments of length N and place them in vectors x. We then estimate the higher-order moments for each of the segments using the following approximation $$\hat{m}_r = \frac{1}{N}\sum_{n=0}^{N-1}(x_n - \bar{x})^r. \quad (6)$$

where $\hat{m}_r$ is the estimate of the $m^{th}$ order moment of the collected waveform samples, and $\bar{x}$ is the mean value for the N given samples of data defined as $$\bar{x} = \frac{1}{N}\sum_{n=0}^{N-1}x_n. \quad (7)$$

Using (5) one can then estimate the cumulants for the received signal samples.

II. Algorithm System

Since the cumulants are computed from the estimates of the moments for every segment of duration N, the longer the segment, better are the statistics and better the estimation. However, in practice it is not possible to keep N to be extremely large and it is limited by the duty cycle of the signal itself, and the rate at which the signal changes. This means that even if the received waveform belongs to Class Noise, it is possible that the cumulants may be non-zero. Hence, instead of making a hard decision, we define a probability $P_{Signal}$ that a certain segment belongs to the Class Signal. We also define a threshold which when exceeded, increases the probability that the received waveform falls into Class Signal, and when not, decreases the same. The algorithm system for this is as follows:

Signal Detection Algorithm System

Let R be the number of cumulants of the order greater than two available for computation, and choose some $0<\delta<1$. In this embodiment we let $$\delta = \frac{0.5}{R}.$$

Let $P_{Signal}=0:5$ and choose some $\gamma \in \{1, 2, \ldots\}$. Compute all the R+2 moments and cumulants.
1. for r=2 to (R+2);
   if $|cr|<\gamma|m2|^{r/2}$, then $P_{Signal}=P_{Signal}-\delta$,
   else if $|cr|\geq\gamma|m2|^{r/2}$, then $P_{Signal}=P_{Signal}+\delta$
   end
2. If $P_{Signal}\geq 0.5$ then x belongs to Class Signal,
3. If $P_{Signal}<0.5$ then x belongs to Class Noise.

The parameter γ is used to control the $P_{FA}$ and the $P_D$. At low values of γ, $P_{FA}$ is high and $P_D$ is low, whereas, as γ increases, $P_{FA}$ falls and $P_D$ increases. For most cognitive radio applications, higher false alarms are tolerable as long all the signals that are present are detected accurately.

A. Detection of a Broad Class of Signals

Many types of information bearing signals show a Gaussian distribution in the time domain whereas in the frequency domain they are non-Gaussian. For example, the amplitude distribution of a direct sequence spread spectrum (DSSS) signal in the time-domain is non-Gaussian. On the other hand, the amplitude distribution of the multi-carrier signal samples, formed as a result of orthogonal frequency division multiplexing (OFDM) in the time-domain is Gaussian, but the distribution of its complex samples in the frequency domain is not. Hence in order to be able to detect all these signal types, we apply the algorithm in time as well as in the frequency domains as shown in FIG. 1. The received waveform samples are divided into segments of length N, and are sent to two different branches. One detects the presence of the signal in the time domain and the other in the frequency domain. Frequency domain detection is performed by first taking Fourier transform of each of the segments as $$X_k = \frac{1}{\sqrt{N}} \sum_{n=0}^{N-1} x_n \exp\left\{-j\frac{2\pi nk}{N}\right\}, k = 0, 1, \ldots, N-1. \qquad (8)$$

the samples $X_k$'s are converted to vectors X and sent to our proposed signal detection algorithm system. The output probabilities originating from the time-domain detection and the frequency-domain detection are weighted equally and added together and if the net value is greater than or equal to 0.5, then the received waveform segment falls into Class Signal, otherwise it is falls into Class Noise. It must be noted if the received waveforms segments or their Fourier transforms are complex then they are first divided into their real and imaginary parts and processed using the signal detection algorithm separately.

As a by-product of the signal detection algorithm, it is possible to estimate the Power Spectral Density (PSD) using the following known equation $$PSD_k = |X_k|^2 \qquad (9)$$

The Average Channel Power (ACP) may also be derived from equation (8) and computed as $$ACP = \sum_{k=0}^{N-1} |X_k|^2 \qquad (10)$$

There are other parameters such as the Received Signal Strength Indicator (RSSI), Carrier to Interference plus Noise Ratio (CINR) which are implementation specific but are related to either the PSD or the ACP. Field Strength is defined as the magnitude of the received electromagnetic field which excites the receiving antenna. The PSD and ACP are functions of the Field Strength. It is possible to derive an estimate of the Field Strength in a particular band using PSD or ACP.

III. Applications of the Signal Detection Algorithm System

A. Time Frequency Detection Ratio and Single-Carrier, Multi-Carrier Hypotheses Testing The TFDR as the name suggests denotes the ratio of the number of segments detected in the time domain to the number of segments detected in the frequency domain $N_{TD}$ over a particular length of time. Hence $$TFDR = \frac{N_{TD}}{N_{TD} + N_{FD}},$$

where $N_{TD}$ is the number of segments detected in the time-domain and $N_{TD}$ is the number of segments detected in the frequency domain. As previously suggested, a single-carrier waveform such as DSSS shows a non-Gaussian amplitude distribution of its samples in the time-domain. Hence we expect the $TFDR_{DSSS} \geq 0.5$. On the other hand, a multi-carrier waveform such as OFDM, shows Gaussian amplitude distribution in the time-domain, however a non-Gaussian amplitude distribution in the frequency domain. As a result, we expect that $TFDR_{OFDM} < 0.5$. Hence this algorithm system may also be used to determine if the received waveform falls into Class Single-Carrier or Class Multi-Carrier.

Once it is known that the received waveform belongs to Class Signal, it is useful to find out how many different signal types are present in it. M. C. Dogan and J. M. Mendel, "Single Sensor Detection and Classification of Multiple Sources by Higher Order Spectra," IEE Proceedings-F, vol. 140, no. 6, pp. 1451-1458, December 1993, the contents of which are incorporated herein by reference, discloses the use of the tri-spectrum of the received waveform. The tri-spectrum is projected onto 2-Dimensions and sampled to form a matrix. The singular value decomposition (SVD) is then applied to find out the dominant components. The number of significant singular values determines the number of signal types present in the received waveform. We apply a similar method for our case. However, instead of tri-spectrum we obtain a compressed spectrogram of the signal only segments. If higher computation power is available, then one may use the tri-spectrum instead. The compressed spectrogram of the signal only segments forms a matrix X. We then take the SVD of this compressed spectrogram, and find out the number of dominant singular values in it which gives us the number of different signal types that are present in the signal.

C. Finding the Basis Functions for the Received Signal

Figure 10:
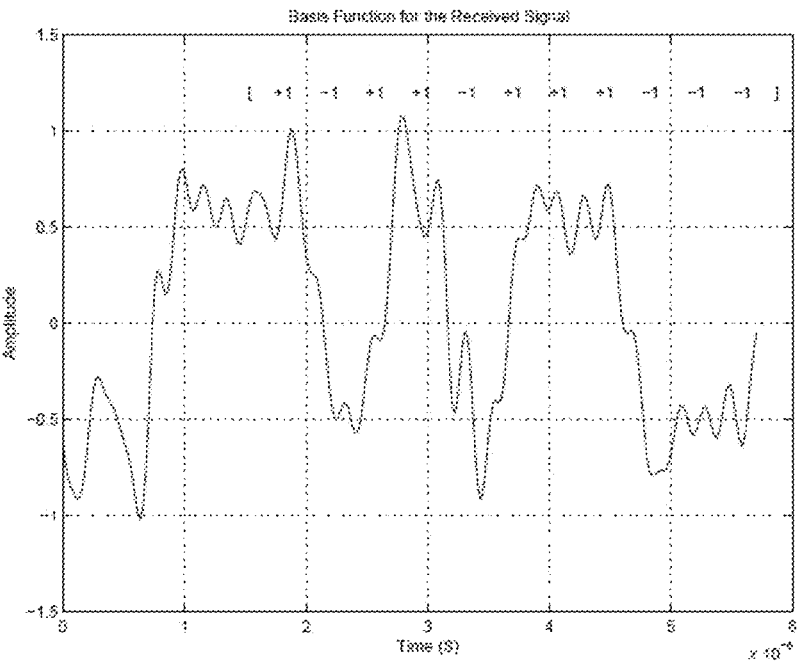
FIG. 10 is a vector corresponding to the first singular value of the SVD of a synchronized signal-only matrix of the over-the-air-collected IEEE 802.11b signal.

Basis functions of the received signals could provide us with important information about the signal itself and what constitutes it. For example, it would be important to know the spreading sequence, given that the received signal is formed using code division multiplexing (CDMA). In order to find the basis functions of the received signal, the SVD of the signal only matrix is obtained. However, rather than choosing the length of the columns of the matrix arbitrarily, some prior synchronization is done on the received waveform to find the underlying periodicity. This estimate of the periodicity in the waveform is used to determine the number of samples in each column of a synchronized signal only matrix X as shown in FIG. 10. Then the SVD of this synchronized signal only matrix is obtained and the vector corresponding to various principal singular values determine the basis functions of the received signal.

IV. Simulation and Experimental Results

Figure 4:
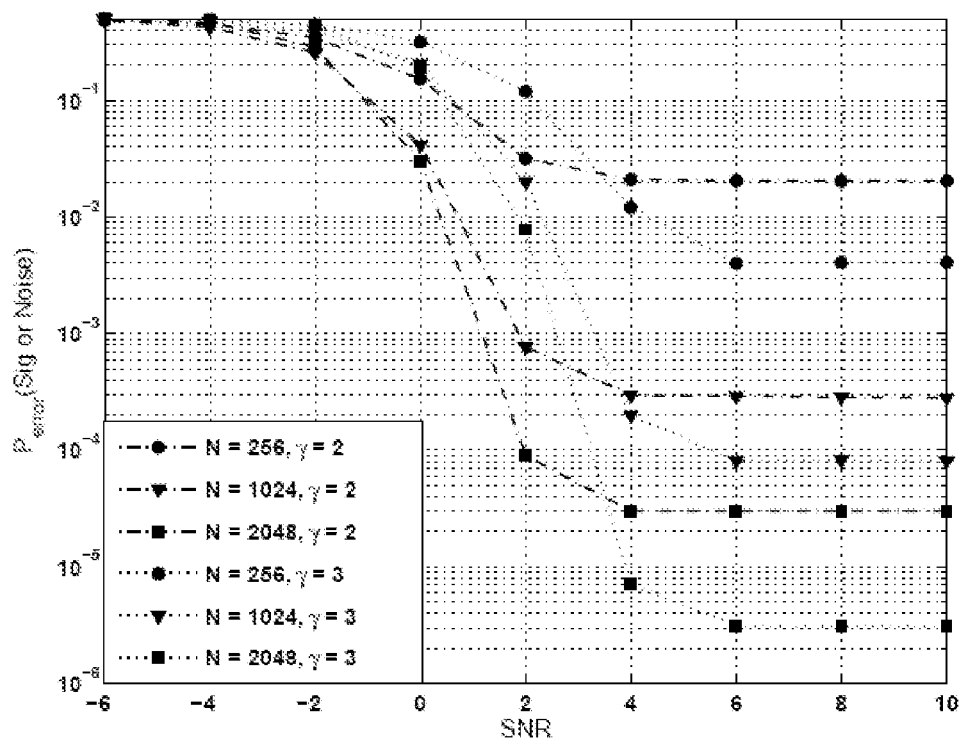
FIG. 4 is a graph showing probability of error in detecting the signal or noise for various values of segment size N and threshold parameter $\gamma$ in an embodiment of the present invention.

This section explains the simulation and experimental results for the signal detection algorithm system and its applications. FIG. 4 shows the probability of error in correct classification of a segment of the received waveform versus the average SNR. The direct sequence spread spectrum (DSSS) waveforms confirming to the IEEE 802.11b Standard, as is disclosed in IEEE Standard 802.11g-2003, Part 11: Wireless LAN Medium Access Control (MAC) and Physical Layer (PHY) Specifications: Higher-speed Physical Layer Extension in the 2.4 GHz Band., IEEE Std. 802.11, 2003, were generated and transmitted over an AWGN channel. The chips at the receiver were over-sampled by a factor of eight, and an average energy in the received samples for the entire data record was used to compute the signal energy. An appropriate noise was added to the received samples. The figure shows the effect of choosing different segment-lengths (N) and different values of the threshold coefficient γ on the probability of error. We calculated the cumulants till the 6th order and hence R for our case was 4. The segment length N was chosen to be of a power of 2 in order to efficiently compute its fast Fourier transform (FFT). Larger the value of N, more accurate are the estimates of the cumulants and lower are the error floors in the probability curves. On the other hand the value of γ may be used to move the curves sideways. Lower value of γ results in a lower threshold and hence lower $P_D$. Higher values of γ results in higher $P_D$ and lower $P_{FA}$. Based on the curves obtained, we choose γ=2 for all our experiments for over-the-air-collected test data.

Figure 5:
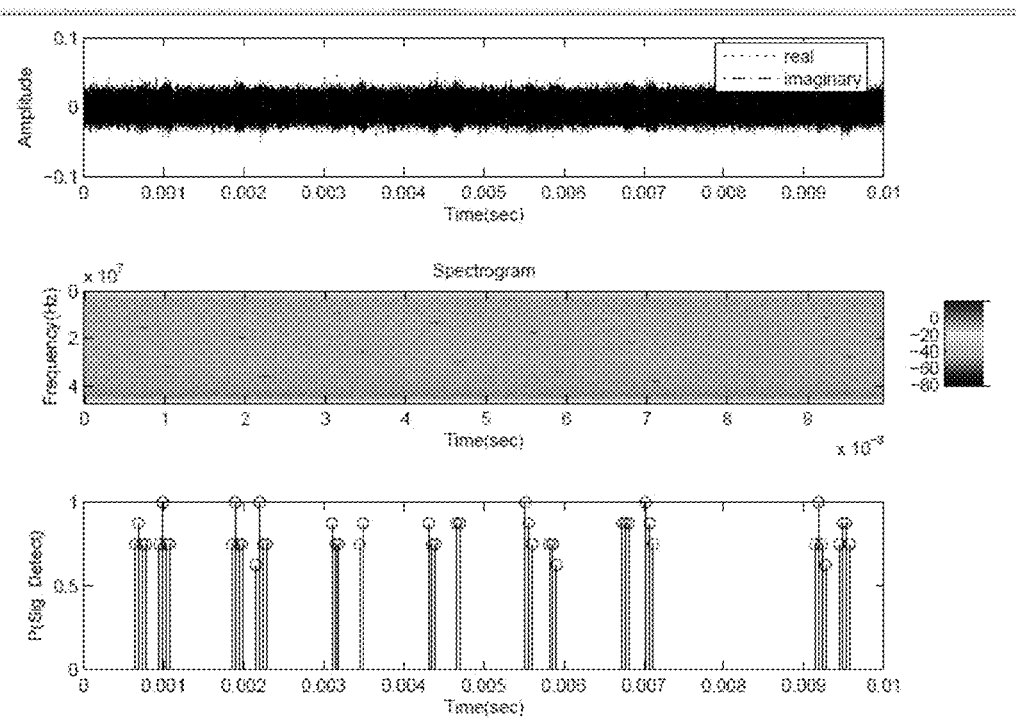
FIG. 5 shows (top) real and imaginary samples of the over-the-air-collected transmissions from Bluetooth devices for a window of 10 mS; (middle) a spectrogram for the collected samples; (bottom) the output of the signal or noise detection algorithm.

FIG. 5 shows the performance of our proposed signal or noise detection algorithm on a narrow-band, narrow-pulse frequency hopping waveform such as Bluetooth™ for personal area networks (PAN), as is disclosed in IEEE Standard for Wireless Personal Area Networks Based on the Bluetooth™ v1.1 Foundation Specifications, http://www.ieee802.org/15/pub/TGI.html, IEEE Std. 802.15.1, 2002, collected using an Agilent 89640 signal analyzer in a trailer located in the parking lot of our company and using a sampling frequency of 47.499 MHz. The Bluetooth devices were kept at an approximate distance of 5 meters from the signal analyzer and cheap isotropic antennas were used to receive the signals. The segment-length (N) was chosen to be 2048 samples, which was equivalent to approximately 50 μS of data to estimate the higher-order cumulants. The FFT block length was also chosen to be of the same size as the segment length. FIG. 5 shows the real and imaginary data for a window of 10 μS. As can be seen the signals are weak and hardly visible. The figure in the middle shows the spectrogram and hence the time frequency distribution (TFD) of the collected signal and finally the bottom figure shows the results of applying our proposed signal or noise detection algorithm with the term γ set at 2.

Figure 6:
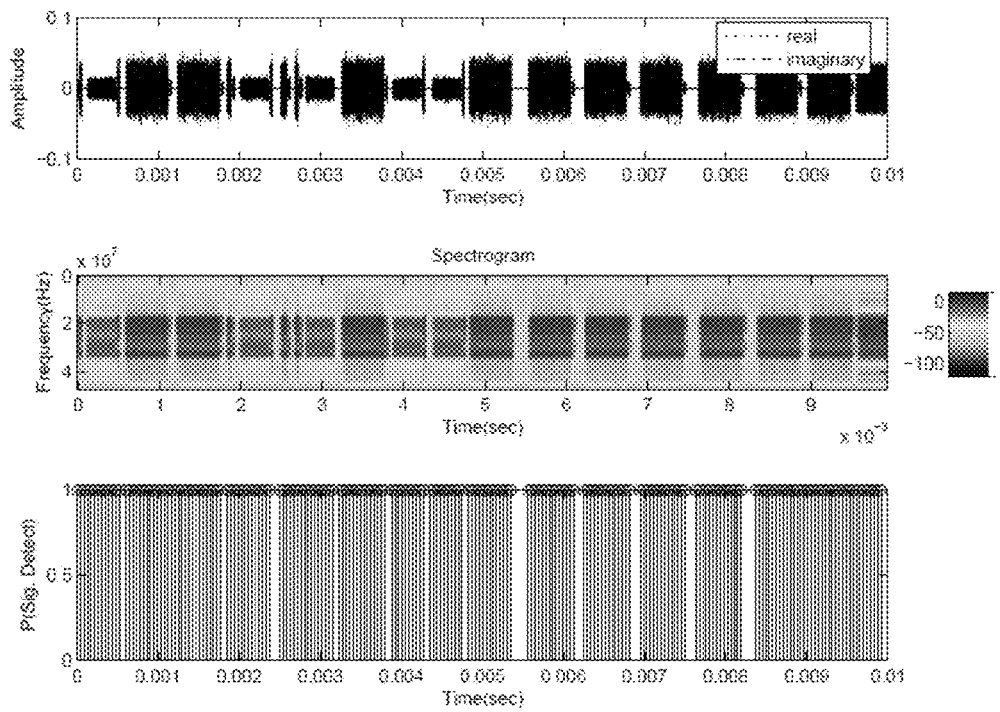
FIG. 6 shows (top) real and imaginary samples of the over-the-air-collected transmissions from IEEE 802.11g devices for a window of 10 mS; (middle) a spectrogram for the collected samples; (bottom) the output of the signal or noise detection algorithm.

FIG. 6 shows the same for an orthogonal frequency division multiplexed (OFDM) type of a received waveform that belonged to the devices conforming to the IEEE 802.11g Standard, as is disclosed in IEEE Standard 802.11g, Part 11: Wireless LAN Medium Access Control (MAC) and Physical Layer (PHY) Specifications: Amendment 4: Further Higher Data Rate Extension in the 2.4 GHz Band., IEEE Std. 802.11, 2003.

Figure 7:
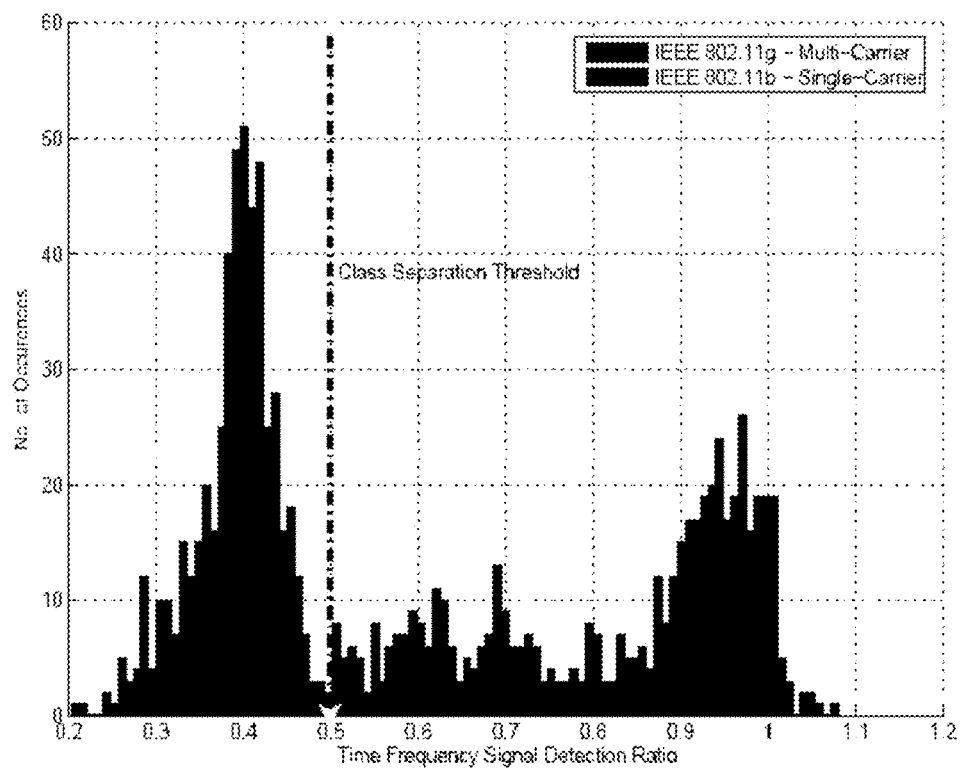
FIG. 7 is a graph showing distribution of the time frequency detection ratio of the over-the-air-collected waveforms belonging to the IEEE 802.11b (DSSS) and IEEE 802.11g (OFDM) waveform types, the threshold being placed at 0.5 and N=2048.

FIG. 7 shows the TFDR statistics for an IEEE 802.11b waveforms using single-carrier transmission and the IEEE 802.11g waveforms using OFDM. TFDR is computed by first dividing the received waveform into 10 mS frames and further dividing each frame into segments of 2048 samples each. We then find the number of segments detected in the time domain versus the number detected in the frequency domain for each frame. The threshold for the class separation was set at 0.5. Based on the over the air collected test data, the IEEE 802.11b frames of 10 mS each were classified as multi-carrier 13 out of 518 times and the IEEE 802.11g frames of the same length were classified as single-carrier 25 out of 565 times. Hence the net probability of error was approximately 3.5%.

Figure 8:
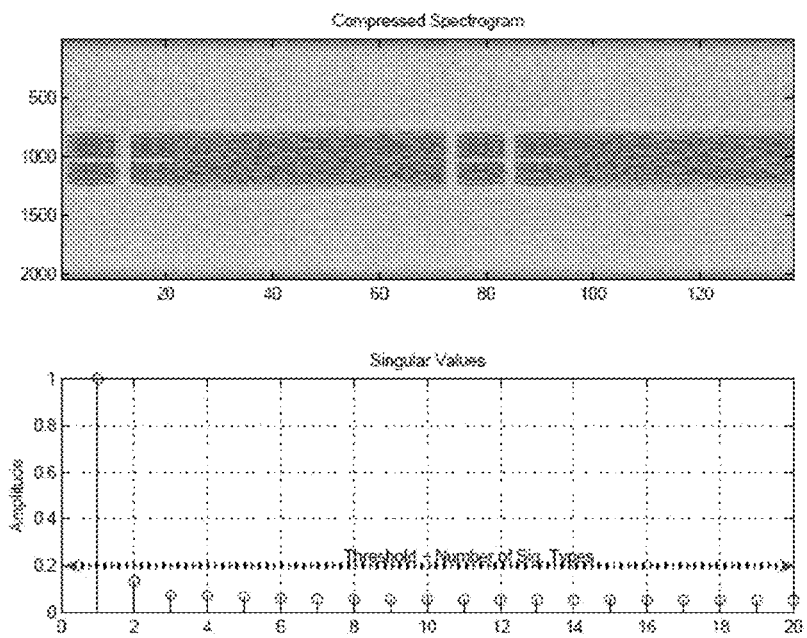
FIG. 8 consists of a compressed spectrogram of the IEEE 802.11b and its singular value distribution.
Figure 9:
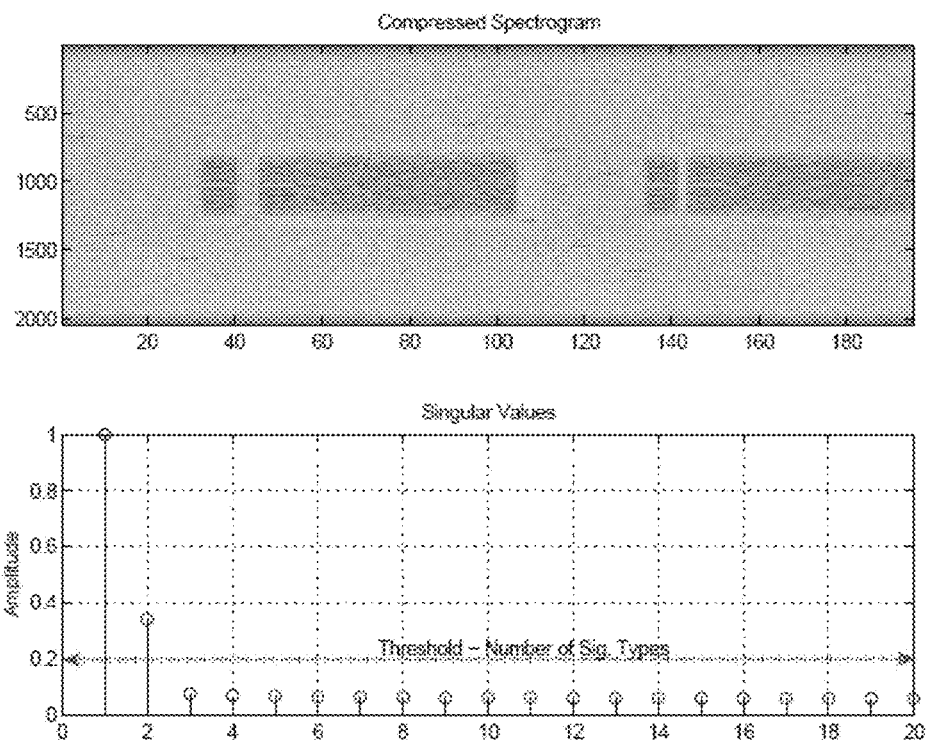
FIG. 9 consists of a compressed spectrogram of the IEEE 802.11b; and the Bluetooth waveforms added together and its singular value distribution.

FIGS. 8 and 9 show the results for identifying the number of different signal types in the received waveforms as explained in IV-B. Based on our detection algorithm system, the segments that are identified to contain useful signals are concatenated to form a signal only vector, and its spectrogram is taken to obtain a 2-D matrix X. The SVD of this compressed spectrogram gives the singular value distribution and the number of dominant singular values determines the number of possible signal types. FIG. 8 shows an IEEE 802.11b compressed spectrogram and the singular value distribution resulting in the identification of only one signal. On the other hand, FIG. 9 shows the compressed spectrogram of the IEEE 802.11b and the Bluetooth waveforms added together and its singular value distribution which results in the identification of two signal types.

FIG. 10 shows the results of identifying the basis functions for the received signal as explained in III-C. The over the air collected IEEE 802.11b waveforms were used to find the basis function. The waveform shown corresponds to the first singular value of SVD of the time synchronized signal only matrix. The IEEE 802.11b waveforms use the spreading sequence given by [+1 −1 +1 +1 −1 +1 +1 +1 −1 −1 −1] and as can be seen in the figure, we can clearly identify this spreading sequence as an output of our finding the basis functions algorithms.

D. Jammer Classification—Denial of Service (DoS) detection

Figure 11:
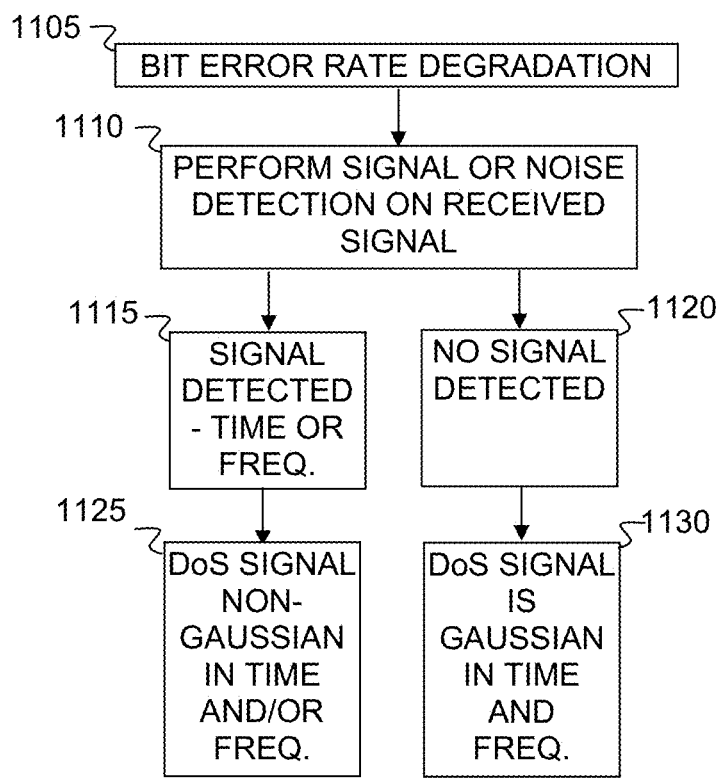
FIG. 11 depicts a simplified flow chart of a method for classifying jammer signals configured in accordance with an embodiment of the invention.

Finally, FIG. 11 depicts a simplified flow chart 1100 of a method for classifying jammer signals. In cases where performance metrics such as the Bit Error Rate (BER) at the receiver show drastic degradation, or the Carrier to Interference plus Noise Ratio (CINR) shows drastic reduction, however, the Received Signal Strength Indicator (RSSI) shows that the received signal energy is quite high, it is possible that the received signal is being jammed—which means that the system is experiencing Denial of Service (DoS) attack 1105. Perform signal or noise detection on the received signal 1110 to separate signal from noise using higher order statistical method previously described (Blind Source Separation). If the signal is detected in the time or the frequency domains 1115, then the jammer waveform is non-Gaussian in time and/or frequency domains 1125. If the signal is not detected 1120, then the jammer waveform is Gaussian in the time and frequency domains 1130.

V. Conclusions

Those skilled in the art will appreciate that an algorithm system has been disclosed that detects a broad class of signals in Gaussian noise using higher-order statistics. The algorithm system was able to detect a number of different signal types. In a typical setting this algorithm system provided an error rate of 3/100 at a signal to noise ratio of 0 dB. This algorithm system gave the time frequency detection ratio which was used to determine if the detected signal fell in Class Single-Carrier of Class Multi-Carrier. Additionally we showed how this algorithm system may be used in applications such as signal identification and finding the basis functions of the received signals.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

The relationship between cumulants and the moments may be used to compute the higher order cumulants in a simple fashion as $$C_n = m_n - \sum_{k=1}^{n-1} \binom{n-1}{k-1} c_k m_{n-k}$$

where $$\binom{n-1}{k-1} = \frac{(n-1)!}{(k-1)! \cdot (n-k)!},$$

and y!=Factorial(y)=y·(y−1)·(y−2)·(y−3) . . . 2·1 Which, when expanded, can be written as Equations (5).

Figure 12:
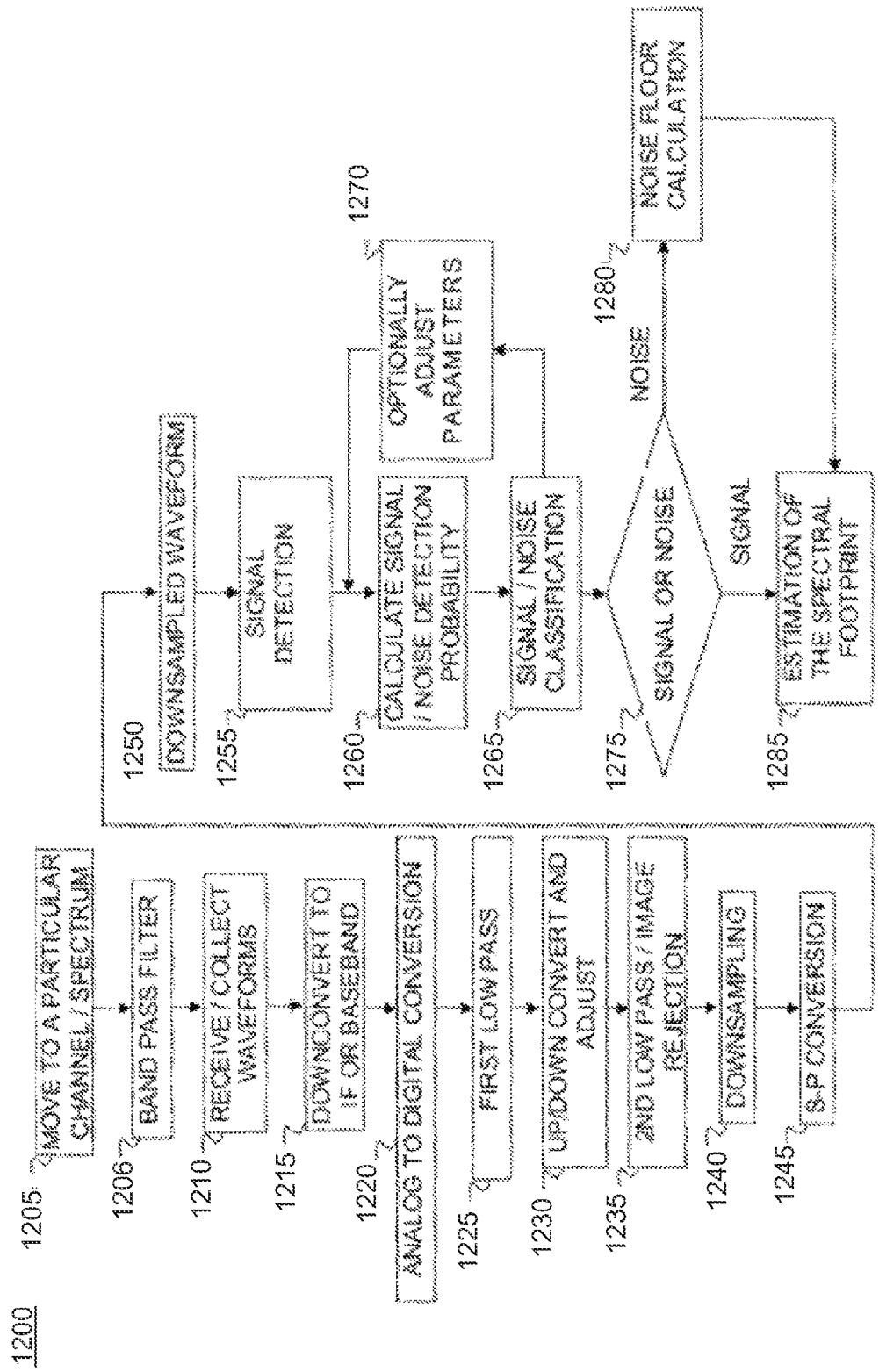
FIG. 12 depicts a simplified flow chart of a Spectrum Sensing Function (SSF) used for detecting a broad class of signals. In accordance with one embodiment, the flow chart represents the steps carried out to detect an ATSC DTV and wireless microphone as well as wireless microphone beacon signals.

FIG. 12 depicts a simplified flow chart 1200 of a generalized Spectrum Sensing Function (SSF) used for detecting a broad class of signals. In accordance with one embodiment, the flow chart represents the steps carried out to detect an ATSC DTV and wireless microphone as well as wireless microphone beacon signals. Embodiments begin with the sensing platform 1205, moving to a particular portion of the spectrum or a channel, followed by a band-pass filter 1206 and receiving/collecting waveforms signals 1210. The instruction to move and collect waveforms from a particular channel may come from a central or local authority such as a Spectrum Manager (SM). Next, downshift (downconvert) 1215 the received waveform 1210 of the signals or noise collected at the Radio Frequency (RF) to the Intermediate Frequency (IF) or the base band. Convert the received analog waveforms to digital discrete time waveforms using an Analog to Digital (A/D) converter 1220. Pass the down-converted digitized signal through a Low Pass (LP) filter of total Bandwidth ($BW_1$) filter 1225 used to limit the spectral content as well as reject any image. Upshift (upconvert) the signal 1230 by approximately $f_v$ MHz. Pass the resultant signals through a second Low Pass (LP) 1235 of bandwidth ($BW_2 = N_{FFT}/((T_{sensing}) Z)$) to reject any further unwanted parts of the spectrum followed by downsampling 1240 of the signals by a factor of floor($Fs/BW_2$). $T_{sensing}$=Sensing Duration, Z=1, 2, 3, determines the multiples of the sensing duration. For example, $T_{sensing}$=0.005 and Z=1 implies the total sensing duration of 5 mS. Similarly, $T_{sensing}$=0.005 and Z=2 implies the total sensing duration of 10 mS. Fs=sampling frequency of the signal before downsampling, and $N_{FFT}$=Size of the Fast Fourier Transform (FFT) used. Convert the input samples from serial to parallel 1245. This may be carried out by using a FIFO buffer. The resultant downsampled waveform 1250 is then passed on to the signal detection stage 1255. The output of the signal detection stage is a probability measure 1260 which signifies whether a particular segment of the downsampled waveform contains a valid signal or whether it is just noise. This signal or noise detection probability measure results in signal or noise classification 1265 for each segment of downsampled waveform. Based on the detection performance, the parameters for the signal detection stage may be optionally adjusted 1270. The collected segments of the waveform are then further processed to determine the noise floor 1280 or the spectral footprint 1285 based on whether the segment contains signal or noise 1275.

Figure 13:
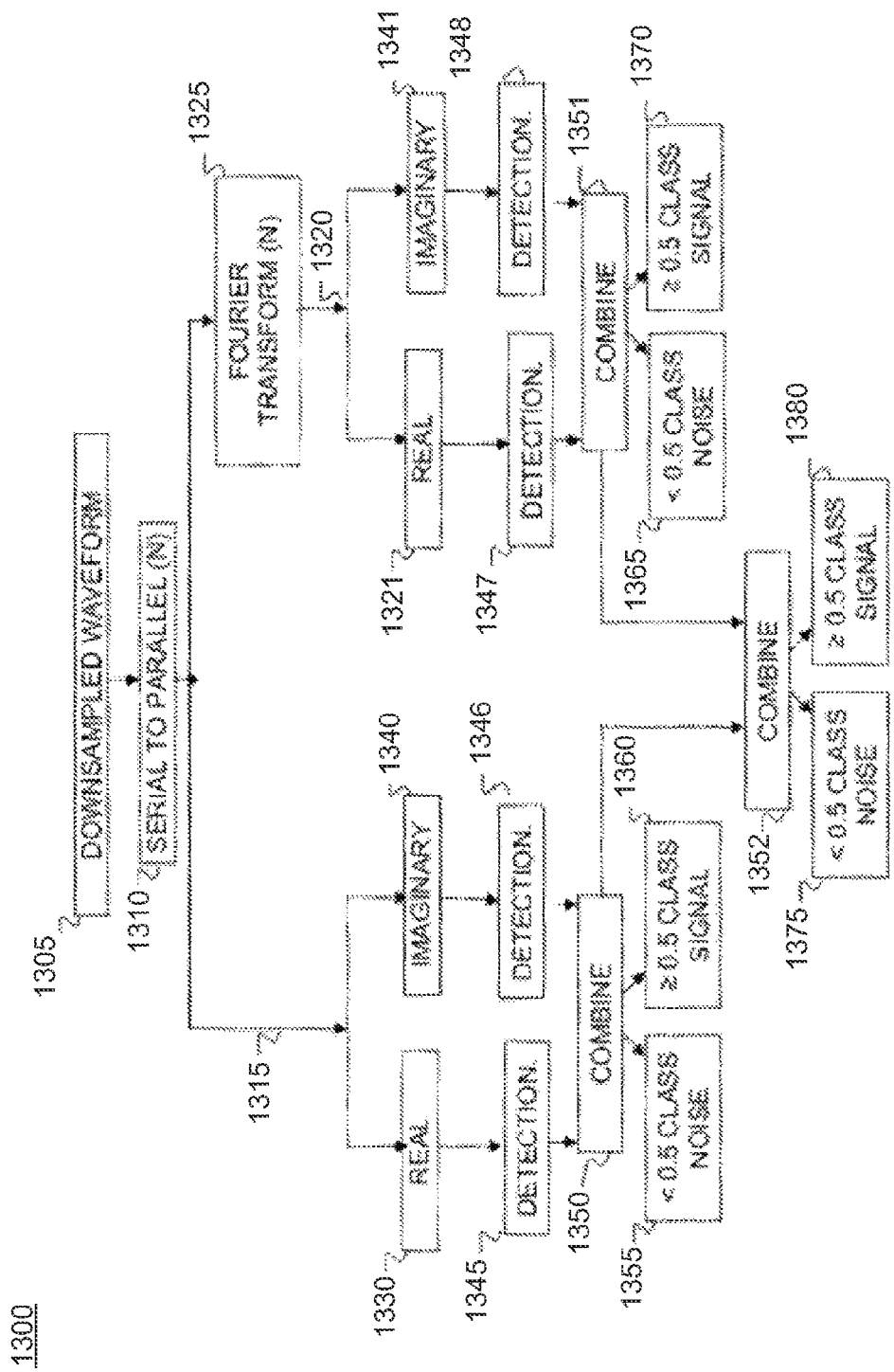
FIG. 13 depicts a simplified flow chart of the signal detector which takes sampled waveform as its inputs and makes a decision whether a particular segment of the received waveform contains a useful signal or belongs to noise. The figure depicts the time and frequency aspects of a method for detecting a broad class of signals in accordance with one embodiment.

FIG. 13 shows the signal detection stage. It depicts a simplified flow chart 1300 of time and frequency aspects of a method for detecting a broad class of signals. The received waveform samples 1305 are divided into segments of length N, using a serial to parallel (S/P) converter or a FIFO buffer 1310 and are sent to two different branches. One detects the presence of the signal in the time domain 1315 and the other in the frequency domain 1320. Frequency domain detection is performed by first taking Fourier transform 1325 of each of the segments as $$X_k = \frac{1}{\sqrt{N}} \sum_{n=0}^{N-1} x_n \exp\left\{-j\frac{2\pi nk}{N}\right\}, k = 0, 1, \ldots, N-1,$$

Time and frequency domain samples are further broken down into real (1330 and 1331 respectively) and imaginary (1340 and 1341 respectively) component vectors and each of these segments or vectors are subjected to the detection algorithm (1345, 1346, 1347, 1348). For the sake of simplicity, each of the segments of length N will be denoted by a variable X; where in the time domain X consists of the real or the imaginary components of the downsampled waveform and in the frequency domain, X consists of the real or the imaginary components of the Fourier coefficients $X_k$s as shown in Equation (9). The outputs from the detection algorithm are the probability measures if a particular real or imaginary, time or frequency segments contain signal or noise. These measures may be combined (1350, 1351, 1352, 1355, 1360, 1365, 1370, 1375, 1380) in various manner as will be described later to produce the net outcomes as to whether a particular segment of the downsampled waveform contains a useful signal or it is simply noise.

Figure 14:
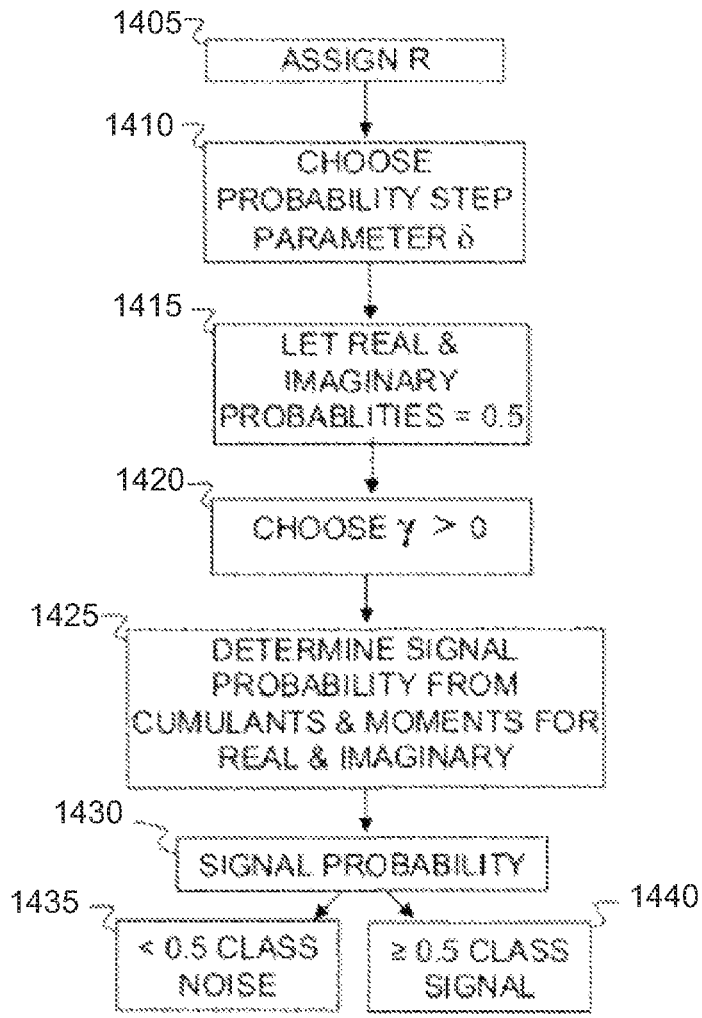
FIG. 14 depicts a simplified flow chart of a method for detecting a broad class of signals in accordance with one embodiment.

FIG. 14 depicts a simplified flow chart 1400 of a method for detecting a broad class of signals. Let R 1405 be the number of moments ($m_{r\_real}$, $m_{r\_imaginary}$) and cumulants ($c_{r\_real}$, $c_{r\_imaginary}$) of the order greater than two available for computation of the real and the imaginary parts of each of the segments (X) of data respectively.

Choose 1410, a Probability Step Parameter 0<67 <1; For example let δ=0.5/R.

Let $P_{Signal\_real} = P_{Signal\_imaginary} = 0.5$; 1415

Choose some γ>0; $\gamma_{typical} = 1$

Determine signal probability 1425:

for r=2 to (R+2);

if $|c_{r\_real}| < \gamma |m_{2\_real}|^{r/2}$, => $P_{Signal\_real} = P_{Signal\_real} - \delta$,
    elseif $|c_{r\_real}| \geq \gamma |m_{2\_real}|^{r/2}$, => $P_{Signal\_real} = P_{Signal\_real} + \delta$ end, if $|c_{r\_imaginary}| < \gamma |m_{2\_imaginary}|^{r/2}$, => $P_{Signal\_imaginary} = P_{Signal\_imaginary} - \delta$,
    elseif $|c_{r\_imaginary}| \geq \gamma |m_{2\_imaginary}|^{r/2}$, => $P_{Signal\_imaginary} = P_{Signal\_imaginary} + \delta$ end, end (Results may be combined as in FIGS. 13, 1350, 1351, and 1352) $P_{signal} = aP_{Signal\_real} + bP_{Signal\_imaginary}$ where a and b weight parameters. As an example a=b=0.5

This produces a Signal Probability 1430. If Signal Probability $P_{signal} \geq 0.5$, then X belongs to Class Signal 1440; if $P_{signal} < 0.5$ then X belongs to Class Noise 1435.

Figure 15:
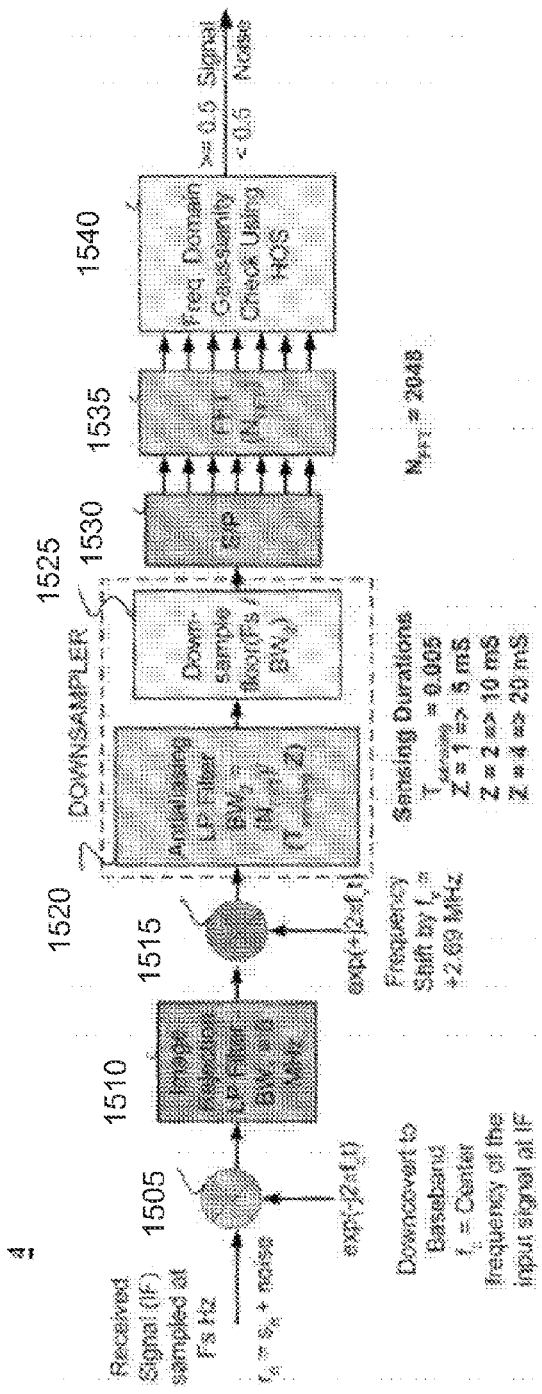
FIG. 15 is a block diagram for the signal or noise identification method for the detection of Advanced Television Systems Committee (ATSC) digital television (DTV) Signals in the presence of Gaussian noise in accordance with one embodiment. The proposed block diagram may also be used to detect wireless microphone and wireless microphone beacon signals.

FIG. 15 is a block diagram 1500 for a system for the signal or noise identification method applied to the detection ATSC DTV signals in the presence of Gaussian noise. It follows the flow chart of the method of FIGS. 12, 13, and 14. Embodiments receive a signal Intermediate Frequency (IF) sampled at Fs Hz, where $r_n = s_n +$noise. The signal is downshifted (downconverted) 1505 to Baseband exp($-j2\pi f_c t$) where $f_c$=the center frequency of the input signal at IF. The downconverted signal is passed through an image rejection first Low Pass (LP) filter 1510 of total Bandwidth ($BW_1$=8 MHz)

for image rejection. The frequency is then upshifted 1515 exp(+j2πf$_v$t) where f$_v$=+2.69 MHz, so that any DTV signal video carriers are shifted closer to 0 Hertz. The resultant signals pass through a second Antialiasing Low Pass (LP) Filter 1520 of bandwidth BW$_2$=N$_{FFT}$/((T$_{sensing}$) Z). N$_{FFT}$ is the size of the FFT used (2048 in this case) and T$_{sensing}$ is the Sensing Duration. Z determines the multiples of the sensing duration and may equal, for example, 1, 2, 4. If T$_{sensing}$=0.005 seconds and Z=1, the total sensing duration is 5 mS. Similarly, T$_{sensing}$=0.005 and Z=2 implies a total sensing duration of 10 mS. This step is followed by downsampling 1525 the signals by a factor of floor (Fs/BW$_2$). Fs is the sampling frequency of the original received signal and BW$_2$ is as previously defined. The input samples are next converted from serial to parallel 1530. Embodiments employ a FIFO buffer and convert samples to the frequency domain using a process such as the Fast Fourier Transform (FFT) as shown in Equation (7) of length N$_{FFT}$ 1535. N$_{FFT}$ may equal 2048. Collect samples at the output of the FFT 1535. Then perform signal detection in the frequency domain using HOS 1540. This is determined from the higher order moments and cumulants 1540 of the real and imaginary portions of the stored samples using Equations (5) and (6), and as introduced in FIGS. 13 and 14. Again, as introduced in FIGS. 13 and 14, apply the following steps to calculate signal probability 1540.

Let R be the number of moments (m$_{r\_real}$, m$_{r\_imaginary}$) and cumulants (c$_{r\_real}$, c$_{r\_imaginary}$) of the order greater than two available for computation of the real and the imaginary parts of each of the segments (X) of data respectively, Choose a Probability Step Parameter 0<δ<1; For example let δ=0.5/R.

Let P$_{Signal\_real}$=P$_{Signal\_imaginary}$=0.5;
Choose some γ>0; γ$_{typical=}$1
for r=2 to (R+2);
    if   |c$_{r\_real}$|<γ|m$_{2\_real}$|$^{r/2}$,  =>P$_{signal\_real}$=P$_{signal\_real}$−δ,
    elseif   |c$_{r\_real}$|≥γ|m$_{2\_real}$|$^{r/2}$,  =>P$_{Signal\_real}$= P$_{signal\_real}$+δ end,
    if  |c$_r$$^{imaginary}$|≥γ|m$_{2\_imaginary}$|$^{r/2}$,  =>P$_{Signal\_}$$^{imaginary=}$ P$_{signal\_imaginary}$−δ,
    elseif   |c$_{r\_imaginary}$|≥γ|m$_{2\_imaginary}$|$^{r/2}$,  => P$_{signal\_imaginary}$+δ end, end
P$_{Signal}$=aP$_{Signal\_real}$+bP$_{Signal\_imaginary}$ where a and b weight parameters.

As an example, a=b=0.5.

For signal classification 1540, if P$_{signal}$≥0.5, then X belongs to Class Signal, and the ATSC DTV signal is detected. If P$_{signal}$<0.5, then X belongs to Class Noise and the ATSC DTV signal is not detected. The parameter γ is used to make fine adjustments of P$_{FA}$ if needed (FIG. 12, 1270). As γ increases, P$_{FA}$ decreases and vice-versa. In most cases, γ is kept close to unity. If the value is ≥0.5, the sample is classified as a signal. If the value is <0.5, then the sample is classified as noise. These exact steps described above may be used to detect the wireless microphone as well as the wireless microphone beaconing signals.

What is claimed is:

1. A method for implementing a software defined radio for a Spectrum Sensing Function (SSF) for detecting signals in Gaussian noise, wherein Higher Order Statistics (HOS) are applied to segments of received signals in at least one of time and frequency domains comprising the steps of:

providing a receiver device of said software defined radio comprising a processor;

at an antenna of said receiver device, receiving said received signal comprising a frequency spectrum;

selecting a particular portion of said frequency spectrum;

in a band pass filter, excluding regions of said frequency spectrum that are outside of said selected portion;

in a low noise amplifier, amplifying output of said band pass filter; adjusting amplifier gain for said amplified output of said band pass filter;

in a waveform collector, collecting waveforms from said selected portion of said frequency spectrum;

in a downconverter, downconverting said collected waveforms to shift a characteristic frequency component of said collected waveforms to a specified frequency;

in an analog to digital converter, applying an analog to digital conversion to said downconverted collected waveforms in an analog to digital converter;

applying a low pass filter to filter said downconverted collected waveforms;

up or down converting on a spectrum of interest of said downconverted collected waveforms to shift a characteristic frequency component of said downconverted collected waveforms to a specified detection frequency, producing second-converted waveforms;

sampling said second-converted waveforms to adjust a sampling rate;

applying a serial to parallel converter to convert said sampled second-converted waveforms to a stream of time domain segments, each said time domain segment including a plurality of time domain samples;

applying a Fast Fourier Transform (FFT) to each said time domain segment to obtain a corresponding frequency domain segment, each of said frequency domain segments including a plurality of frequency domain samples in a Fast Fourier Transform stage;

in said processor, detecting at least one signal by processing said segments using Higher Order Statistics; said processing said segments using Higher Order Statistics comprising dividing said data segments into real and imaginary parts, wherein R is a total number of moments (m$_{r\_real}$, m$_{r\_imaginary}$) and cumulants (c$_{r\_real}$, c$_{r\_imaginary}$) of order greater than two available for computation for said real and said imaginary parts of each segment of said data segments respectively;

choosing a value for a probability step parameter (δ) between zero and one;

setting a Psignal_real and a Psignal_imaginary to 0.5;

choosing a value for a fine threshold parameter (γ) greater than zero, wherein said fine threshold parameter γ is used to control a probability of false alarm P$_{FA}$ and a probability of detection P$_D$;

in said processor, computing all R+2 moments and cumulants, wherein for each value of r where r equals 3 to (R plus 2);

if |c$_{r\_real}$| is less than γ|m$_{2\_real}$|$^{r/2}$, then P$_{Signal\_real}$ equals P$_{Signal\_real}$ minus δ;

if |c$_{r\_real}$| is greater than or equal to γ|m$_{2\_real}$|$^{r/2}$, then P$_{Signal\_real}$ equals P$_{Signal\_real}$ plus δ; and wherein if |c$_{r\_imaginary}$| is less than γ|m$_{2\_imaginary}$|$^{r/2}$, then P$_{Signal\_imaginary}$ equals P$_{Signal\_imaginary}$ minus δ;

if |c$_{r\_imaginary}$| is greater than or equal to γ|m$_{2\_imaginary}$|$^{r/2}$, then P$_{Signal\_imaginary}$ equals P$_{Signal\_imaginary}$ plus δ; and P$_{Signal}$ equals aP$_{Signal\_real}$ plus bP$_{Signal\_imaginary}$, wherein a and b are weight parameter coefficients;

in a classifier, classifying each segment as belonging to Class Signal or Class Noise;

assigning said data sample segment to Class Signal if P$_{signal}$ is greater than or equal to 0.5; and assigning said data sample segment to Class Noise if P$_{signal}$ is less than 0.5 and no signal is detected; and in said processor, identifying said at least one signal.

2. The method of claim 1, comprising the step of:
in said processor, processing said at least one signal in said time domain to detect at least one signal.

3. The method of claim 1, comprising the step of:
in said processor, processing said at least one signal in said frequency domain to detect at least one signal.

4. The method of claim 1, comprising the step of:
in said processor, processing said at least one signal in said time as well as said frequency domains and combining results to detect at least one signal.

5. The method of claim 1 comprising the step of:
in said processor, dividing said stream of time domain segments into smaller segments, whereby said Higher Order Statistics (HOS) signal detection is carried out for each of said segments.

6. The method of claim 1, wherein in said processor, results of signal detection in said time and said frequency domains are combined to determine if said data segment belongs to Class Signal or Class Noise; and
wherein combining is defined by Psignal equals c Psignal_time plus d Psignal_frequency, where c and d are coefficients such that c plus d equals 1.

7. The method of claim 1 further comprising:
in said processor, pre-processing, said preprocessing comprising at least one of filtering, noise whitening, down-conversion, up-conversion, frequency shift, frequency translation, re-sampling, down-sampling, up-sampling, signal conditioning, wherein said preprocessing is applied to said data segments before computing said HOS of said data segments in at least one of said time and said frequency domains, and wherein sequence of said preprocessing is alterable.

8. The system of claim 1, wherein said received signals are in base-band.

9. The system of claim 1, wherein said received signals are in pass-band.

10. The system of claim 1, wherein said received signals are single-carrier.

11. The system of claim 1, wherein said received signals are multi-carrier.

12. The system of claim 1, wherein said received signals are frequency hopping.

13. The system of claim 1, wherein said received signals are non-frequency hopping.

14. The system of claim 1, wherein said received signals are at least one of Direct Sequence Spread Spectrum and Multi-Carrier Spread Spectrum.

15. The system of claim 1, wherein said received signals are non-Gaussian in said time domain.

16. The system of claim 1, wherein said received signals are non-Gaussian in said frequency domain.

17. The method of claim 1, wherein detecting said at least one signal using said higher order statistics further comprises:
adjusting said fine threshold parameter ($\gamma$); and
in said processor, reclassifying said at least one signal.

18. The system of claim 1, wherein one SSF interfaces with at least one of a Spectrum Manager or a Cognitive Engine, said Spectrum Manager or said Cognitive Engine performing at least one of configuring said channel, configuring said sub-band, configuring a waveform, configuring a protocol, and configuring an operating frequency.

19. The system of claim 1, wherein a plurality of SSFs interface with at least one of a Spectrum Manager or a Cognitive Engine, said Spectrum Manager or said Cognitive Engine performing at least one of configuring said channel, configuring said sub-band, configuring a waveform, configuring a protocol, and configuring an operating frequency.

20. The system of claim 1, wherein a plurality of SSFs interface with a plurality of Spectrum Managers or Cognitive Engines, said Spectrum Manager or said Cognitive Engine performing at least one of configuring said channel, configuring said sub-band, configuring a waveform, configuring a protocol, and configuring an operating frequency.

21. The system of claim 1, wherein the decision on whether a signal is detected in said channel or sub-band is used by a Cognitive Engine or a Spectrum Manager to further arrive at a decision on whether said channel or sub-band may be used for communications, said Spectrum Manager or said Cognitive Engine performing at least one of configuring said channel, configuring said sub-band, configuring a waveform, configuring a protocol, and configuring an operating frequency.

22. The system of claim 1, wherein said SSF reports total signal energy in every channel for at least one of a sub-band, a Power Spectral Density (PSD), an Average Channel Power (ACP), a Received Signal Strength Indicator (RSSI), a Carrier to Interference plus Noise Ratio (CINR), or a Field Strength as input to at least one of a Spectrum Manager or a Cognitive Engine to prioritize use of said channel or sub-band, said Spectrum Manager or said Cognitive Engine performing at least one of configuring said channel, configuring said sub-band, configuring a waveform, configuring a protocol, and configuring an operating frequency.

23. The system of claim 22, wherein said channel or said sub-band with lowest PSD, RSSI, or Field Strength is selected for communications.

24. The method of claim 1, comprising:
in said processor, choosing a probability step parameter ($\delta$) equal to one-half the inverse of a number of moments and cumulants of order greater than two available for computation of real and imaginary parts of each segment of said received signal.

25. The method of claim 24, comprising:
in said processor, choosing a subset of said cumulants for computation of signal detection probabilities.

26. The system of claim 1, wherein Class Signal or Class Noise determination is performed in said frequency domain by computing Psignal_frequency, where Psignal_frequency equals Psignal computed in said frequency domain.

27. The method of claim 1, comprising:
in said processor, choosing a subset of cumulants greater than two for computation of signal detection probabilities.

28. The method of claim 1, comprising:
in said processor, choosing even ordered cumulants for computation of signal detection probabilities.

29. The method of claim 1, comprising:
in said processor, choosing a subset of even ordered cumulants for computation of signal detection probabilities.

30. The system of claim 1, wherein classifying said detected signal into Class Single Carrier or Class Multi Carrier is based on a Time Frequency Detection Ratio.

31. A method for implementing a software defined radio for a spectrum sensing function (SSF) for detecting signals in Gaussian noise, wherein Higher Order Statistics (HOS) are applied to segments of received signals in at least one of time and frequency domains comprising the steps of:
providing a receiver device of said software defined radio comprising a processor;
receiving from an antenna, an input signal in said receiver device;
selecting, in said receiver device, a particular portion of a frequency spectrum of said received input signal;

dividing received data sample stream of said particular portion of said frequency spectrum into smaller segments, whereby said HOS signal detection is carried out for each of said segments;

in said processor, pre-processing, said preprocessing comprising at least one of filtering, noise whitening, down-conversion, up-conversion, frequency shift, frequency translation, re-sampling, down-sampling, up-sampling, signal conditioning, wherein said preprocessing is applied to said data segments before computing said HOS of said data segments in at least one of said time and said frequency domains, and wherein sequence of said preprocessing is alterable;

in a band pass filter, excluding regions of said frequency spectrum that are outside of said selected portion;

in a low noise amplifier, amplifying output of said band pass filter;

adjusting amplifier gain for said amplified output of said band pass filter;

in a waveform collector, collecting waveforms from said selected portion of said frequency spectrum;

in a downconverter, downconverting said collected waveforms to shift a characteristic frequency component of said collected waveforms to a specified frequency;

in an analog to digital converter, applying an analog to digital conversion to said downconverted collected waveforms in an analog to digital converter;

in a low pass filter, filtering said downconverted collected waveforms;

up or down converting on a spectrum of interest of said downconverted collected waveforms to shift a characteristic frequency component of said downconverted collected waveforms to a specified detection frequency, producing second-converted waveforms;

sampling said second-converted waveforms to adjust a sampling rate;

in a serial to parallel converter, converting said sampled second-converted waveforms to a stream of time domain segments, each said time domain segment including a plurality of time domain samples;

applying a Fast Fourier Transform (FFT) to said data segments to convert time domain of said data segments into said frequency domain in a Fast Fourier Transform stage;

in said processor, detecting at least one signal by processing said segments using Higher Order Statistics, wherein said HOS signal detection is in said time and said frequency domains;

dividing said data segments into real and imaginary parts, wherein R is a total number of moments ($m_{r\_real}$, $m_{r\_imaginary}$) and cumulants ($c_{r\_real}$, $c_{r\_imaginary}$) of order greater than two available for computation for said real and said imaginary parts of each segment of said data segments respectively;

choosing a value for a probability step parameter ($\delta$) equal to one-half the inverse of a number of moments and cumulants of order greater than two available for computation of real and imaginary parts of each segment of said received signal;

choosing a value for a fine threshold parameter ($\gamma$) greater than zero, wherein said fine threshold parameter $\gamma$ is used to control a probability of false alarm $P_{FA}$ and a probability of detection $P_D$;

setting a Psignal_real and a Psignal_imaginary to 0.5;

in said processor, computing all R+2 moments and cumulants, wherein for each value of r where R equals 3 to (R plus 2);

if $|c_{r\_real}|$ is less than $\gamma|m_{2\_real}|^{r/2}$, then $P_{Signal\_real}$ equals $P_{Signal\_real}$ minus $\delta$;

if $|c_{r\_real}|$ is greater than or equal to $\gamma|m_{2\_real}|^{r/2}$, then $P_{Signal\_real}$ equals $P_{Signal\_real}$ plus $\delta$; and wherein if $|c_{r\_imaginary}|$ is less than $\gamma|m_{2\_imaginary}|^{r/2}$, then $P_{Signal\_imaginary}$ equals $P_{Signal\_imaginary}$ minus $\delta$;

if $|c_{r\_imaginary}|$ is greater than or equal to $\gamma|m_{2\_imaginary}|^{r/2}$, then $P_{Signal\_imaginary}$ equals $P_{Signal\_imaginary}$ plus $\delta$; and $P_{Signal}$ equals a$P_{Signal\_real}$ plus b$P_{Signal\_imaginary}$, wherein a and b are weight parameter coefficients;

assigning said data sample segment to Class Signal if $P_{Signal}$ is greater than or equal to 0.5;

assigning said data sample segment to Class Noise if $P_{Signal}$ is less than 0.5 and no signal is detected;

adjusting said fine threshold parameter ($\gamma$);

reclassifying said at least one signal;

in a classifier, classifying a segment as belonging to Class Signal or Class Noise, wherein results of said HOS signal detection in said time and said frequency domains are combined to determine if said data segment belongs to Class Signal or Class Noise; and in said processor, identifying said at least one signal.

32. A system for implementing a software defined radio for Spectrum Sensing and signal identification wherein Higher Order Statistics (HOS) are applied to segments of received signals in time and frequency domains comprising:

an antenna receiving said received signals;

a receiver device comprising a processor receiving said received signals from said antenna;

said processor configured to perform the steps of:

selecting a particular portion of a frequency spectrum;

in a band pass filter, excluding regions of said frequency spectrum that are outside of said selected portion;

in a low noise amplifier amplifying output of said band pass filter;

adjusting amplifier gain for said amplified output of said band pass filter;

in a waveform collector, collecting waveforms from said selected portion of said frequency spectrum;

in a downconverter, downconverting said collected waveforms to shift a characteristic frequency component of said collected waveforms to a specified frequency;

in an analog to digital converter, applying an analog to digital conversion to said downconverted collected waveforms;

in an image rejection first Low Pass (LP) filter, first filtering down-converted signal through said image rejection first Low Pass (LP) filter, wherein an image of said down-converted signal is suppressed producing a first-filtered signal;

in an up converter, upconverting said first-filtered signal, wherein a video carrier would be shifted closer to 0 Hertz frequency;

in a second filter, filtering said upconverted signal producing a second-filtered signal;

in a downsampler, downsampling said second-filtered signal producing a downsampled signal;

in a serial-to-parallel converter, converting samples of said downsampled signal from serial to parallel in a serial to parallel converter producing parallel samples;

collecting said parallel samples;

in a buffer, storing said parallel samples in a buffer producing stored samples;

in a Fast Fourier Transform stage, applying a Fast Fourier

Transform (FFT) to said stored samples to obtain a corresponding frequency domain segment, each of said frequency domain segments including a plurality of frequency domain samples;

in said processor, determining higher order moments and cumulants of real and imaginary portions of said stored samples;

in said processor, calculating signal probability for each of said frequency domain segment; said calculating signal probability comprising dividing said data segments into real and imaginary parts, wherein R is a total number of moments ($m_{r\_real}$, $m_{r\_imaginary}$) and cumulants ($c_{r\_real}$, $c_{r\_imaginary}$) of order greater than two available for computation for said real and said imaginary parts of each segment of said data segments respectively;

choosing a value for a probability step parameter ($\delta$) between zero and one;

setting a Psignal_real and a Psignal_imaginary to 0.5;

choosing a value for a fine threshold parameter ($\gamma$) greater than zero, wherein said fine threshold parameter $\gamma$ is used to control a probability of false alarm $P_{FA}$ and a probability of detection $P_D$;

computing all R+2 moments and cumulants, wherein for each value of r where r equals 3 to (R plus 2);

if $|c_{r\_real}|$ is less than $\gamma |m_{2\_real}|^{r/2}$, then $P_{Signal\_real}$ equals $P_{Signal\_real}$ minus $\delta$;

if $|c_{r\_real}|$ is greater than or equal to $\gamma |m_{2\_real}|^{r/2}$, then $P_{Signal\_real}$ equals $P_{Signal\_real}$ plus $\delta$; and wherein if $|c_{r\_imaginary}|$ is less than $\gamma |m_{2\_imaginary}|^{r/2}$, then $P_{Signal\_imaginary}$ equals $P_{Signal\_imaginary}$ minus $\delta$;

if $|c_{r\_imaginary}|$ is greater than or equal to $\gamma |m_{2\_imaginary}|^{r/2}$, then $P_{Signal\_imaginary}$ equals $P_{Signal\_imaginary}$ plus $\delta$; and $P_{Signal}$ equals $aP_{Signal\_real}$ plus $bP_{Signal\_imaginary}$, wherein a and b are weight parameter coefficients;

in a classifier, classifying each segment as belonging to Class Signal or Class Noise;

in said processor, assigning said data sample segment to Class Signal if $P_{Signal}$ is greater than or equal to 0.5; and in said processor, assigning said data sample segment to Class Noise if $P_{Signal}$ is less than 0.5 and no signal is detected.

33. A method for implementing a software defined radio for classifying a Denial of Service (DoS) signal comprising the steps of:

at an antenna of a signal receiver device comprising a processor, receiving an input signal;

in said processor, determining a bit error rate degradation of said received signal;

in said processor, determining a Carrier to Interference plus Noise Ratio (CINR) of said received signal;

in a signal strength measurement stage, determining a Received Signal Strength Indication (RSSI) of said received signal;

in said processor, performing signal or noise detection on said received signal using higher order statistics (HOS); said performing signal or noise detection on said received signal using Higher Order Statistics comprising dividing said data segments into real and imaginary parts, wherein R is a total number of moments ($m_{r\_real}$, $m_{r\_imaginary}$) and cumulants ($c_{r\_real}$, $c_{r\_imaginary}$) of order greater than two available for computation for said real and said imaginary parts of each segment of said data segments respectively;

in a signal probability calculator, choosing a value for a probability step parameter ($\delta$) between zero and one;

setting a Psignal_real and a Psignal_imaginary to 0.5;

choosing a value for a fine threshold parameter ($\gamma$) greater than zero, wherein said fine threshold parameter $\gamma$ is used to control a probability of false alarm $P_{FA}$ and a probability of detection $P_D$;

in said processor, computing all R+2 moments and cumulants, wherein for each value of r where r equals 3 to (R plus 2);

if $|c_{r\_real}|$ is less than $\gamma |m_{2\_real}|^{r/2}$, then $P_{Signal\_real}$ equals $P_{Signal\_real}$ minus $\delta$;

if $|c_{r\_real}|$ is greater than or equal to $\gamma |m_{2\_real}|^{r/2}$, then $P_{Signal\_real}$ equals $P_{Signal\_real}$ plus $\delta$; and wherein if $|c_{r\_imaginary}|$ is less than $\gamma |m_{2\_imaginary}|^{r/2}$, then $P_{Signal\_imaginary}$ equals $P_{Signal\_imaginary}$ minus $\delta$;

if $|c_{r\_imaginary}|$ is greater than or equal to $\gamma |m_{2\_imaginary}|^{r/2}$, then $P_{Signal\_imaginary}$ equals $P_{Signal\_imaginary}$ plus $\delta$; and $P_{Signal}$ equals $aP_{Signal\_real}$ plus $bP_{Signal\_imaginary}$, wherein a and b are weight parameter coefficients;

in a classifier, classifying each segment as belonging to Class Signal or Class Noise;

assigning said data sample segment to Class Signal if $P_{signal}$ is greater than or equal to 0.5; and assigning said data sample segment to Class Noise if $P_{signal}$ is less than 0.5 and no signal is detected;

thereby detecting time and frequency domain components of said received signal in said processor; and in said processor, identifying Gaussianity of said time and frequency domain components whereby said DoS signal is classified from results of said detecting step.

34. A method for implementing a software defined radio for signal identification comprising the steps of:

at an antenna of a receiver device comprising a processor, receiving said received signal comprising a frequency spectrum;

selecting a particular portion of said frequency spectrum;

in a band pass filter, excluding regions of said frequency spectrum that are outside of said selected portion;

in a waveform collector, collecting waveforms from said selected portion of said frequency spectrum;

in a downconverter, downconverting said collected waveforms to shift a characteristic frequency component of said collected waveforms to a specified frequency;

in an analog to digital converter, applying an analog to digital conversion to said downconverted collected waveforms in an analog to digital converter;

in an image rejection first Low Pass (LP) filter, first filtering down-converted signal wherein an image of said down-converted signal is suppressed producing a first-filtered signal;

in an up converter, upconverting said first filtered signal, wherein a characteristic frequency component of said signal would be shifted closer to 0 Hertz frequency;

in a second filter, second filtering said upconverted signal producing a second-filtered signal;

in a downsampler, downsampling said second filtered signal producing a downsampled signal;

in a serial-to-parallel converter, converting samples of said downsampled signal from serial to parallel producing parallel samples;

collecting said parallel samples;

in a buffer, storing said parallel samples, producing stored samples;

in a Fast Fourier Transform stage, applying a Fast Fourier Transform (FFT) to said stored samples to obtain a corresponding frequency domain segment, each of said frequency domain segments including a plurality of frequency domain samples;

in said processor, determining higher order moments and cumulants of real and imaginary portions of said stored samples;

in said processor, calculating signal probability for each of said frequency domain segment; said determining and calculating steps comprising dividing said segments into real and imaginary parts, wherein R is a total number of moments ($m_{r\_real}$, $m_{r\_imaginary}$) and cumulants ($c_{r\_real}$, $c_{r\_imaginary}$) of order greater than two available for computation for said real and said imaginary parts of each segment of said segments respectively;

choosing a value for a probability step parameter ($\delta$) equal to one-half the inverse of a number of moments and cumulants of order greater than two available for computation of real and imaginary parts of each segment of said received signal;

setting a Psignal_real and a Psignal_imaginary to 0.5;

choosing a value for a fine threshold parameter ($\gamma$) greater than zero, wherein said fine threshold parameter $\gamma$ is used to control a probability of false alarm $P_{FA}$ and a probability of detection $P_D$;

in said processor, computing all R+2 moments and cumulants, wherein for each value of r where r equals 3 to (R plus 2);

if $|c_{r\_real}|$ is less than $\gamma|m_{2\_real}|^{r/2}$, then $P_{Signal\_real}$ equals $P_{Signal\_real}$ minus $\delta$;

if $|c_{r\_real}|$ is greater than or equal to $\gamma|m_{2\_real}|^{r/2}$, then $P_{Signal\_real}$ equals $P_{Signal\_real}$ plus $\delta$; and wherein if $|c_{r\_imaginary}|$ is less than $\gamma|m_{2\_imaginary}|^{r/2}$, then $P_{Signal\_imaginary}$ equals $P_{Signal\_imaginary}$ minus $\delta$;

if $|c_{r\_imaginary}|$ is greater than or equal to $\gamma|m_{2\_imaginary}|^{r/2}$, then $P_{Signal\_imaginary}$ equals $P_{Signal\_imaginary}$ plus $\delta$; and $P_{Signal}$ equals $aP_{Signal\_real}$ plus $bP_{Signal\_imaginary}$, wherein a and b are weight parameter coefficients;

in a classifier, classifying each segment as belonging to Class Signal or Class Noise;

assigning said data sample segment to Class Signal if $P_{Signal}$ is greater than or equal to 0.5; and assigning said data sample segment to Class Noise if $P_{Signal}$ is less than 0.5 and no signal is detected; and in said processor, identifying said at least one signal.

35. The method of claim 34 comprising:

in said processor, choosing all cumulants greater than two for computation of signal detection probabilities.

36. The method of claim 34 comprising:

in said processor, choosing a subset of cumulants for computation of signal detection probabilities.

* * * * *